US011526291B2

(12) United States Patent
Cai et al.

(10) Patent No.: US 11,526,291 B2
(45) Date of Patent: *Dec. 13, 2022

(54) INTEGRATED HIERARCHICAL STORAGE MANAGEMENT

(71) Applicant: Cohesity, Inc., San Jose, CA (US)

(72) Inventors: Zheng Cai, Cupertino, CA (US); Vijay Pasikanti, Sunnyvale, CA (US); Ganesha Shanmuganathan, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/348,406

(22) Filed: Jun. 15, 2021

(65) Prior Publication Data

US 2021/0382646 A1 Dec. 9, 2021

Related U.S. Application Data

(63) Continuation of application No. 16/533,356, filed on Aug. 6, 2019, now Pat. No. 11,150,830, which is a (Continued)

(51) Int. Cl.
*G06F 3/00* (2006.01)
*G06F 3/06* (2006.01)
(Continued)

(52) U.S. Cl.
CPC .......... *G06F 3/0649* (2013.01); *G06F 3/0611* (2013.01); *G06F 3/0643* (2013.01);
(Continued)

(58) Field of Classification Search
CPC .... G06F 3/0649; G06F 3/0611; G06F 3/0685; G06F 3/0653; G06F 3/0643; G06F 16/119; G06F 16/185; G06F 16/1734
See application file for complete search history.

(56) References Cited

U.S. PATENT DOCUMENTS 5,751,997 A 5/1998 Kullick
7,257,690 B1 8/2007 Baird
(Continued)

FOREIGN PATENT DOCUMENTS

EP 3451173 6/2020
WO 2019045987 3/2019

OTHER PUBLICATIONS

Jeff Draper et al, "The Architecture of the DIVA Processing-In-Memory Chip", Jun. 22-26, 2002, p. 14 (Year: 2002) (Year: 2002).*
Draper et al, "The Architecture of the DIVA Processing-In-Memory Chip", Jun. 22-26, 2002, p. 14 (Year: 2002).

*Primary Examiner* — Craig S Goldschmidt
(74) *Attorney, Agent, or Firm* — Van Pelt, Yi & James LLP

(57) ABSTRACT

File access statistics associated with a content file are maintained by a file tier agent of a secondary storage system. The content file is accessible via a primary storage system. A target storage tier corresponding to the file access statistics associated with the content file is determined according to one or more policies. At least a portion of data of the content file is migrated to the determined storage tier while accessibility of the content file via the primary storage system is maintained.

20 Claims, 14 Drawing Sheets

Related U.S. Application Data continuation of application No. 16/115,351, filed on Aug. 28, 2018, now Pat. No. 10,416,919.

(51) Int. Cl.
*G06F 16/11* (2019.01)
*G06F 16/185* (2019.01)
*G06F 16/17* (2019.01)

(52) U.S. Cl.
CPC .......... *G06F 3/0653* (2013.01); *G06F 3/0685* (2013.01); *G06F 16/119* (2019.01); *G06F 16/1734* (2019.01); *G06F 16/185* (2019.01)

(56) References Cited

U.S. PATENT DOCUMENTS

| | | |
|---|---|---|
| 10,255,137 B1 | 4/2019 | Panidis |
| 2007/0299880 A1 | 12/2007 | Kawabe |
| 2013/0110778 A1* | 5/2013 | Taylor ................ G06F 11/1435 707/624 |
| 2013/0111171 A1 | 5/2013 | Hirezaki |
| 2014/0244937 A1* | 8/2014 | Bloomstein ......... G06F 16/1748 709/212 |
| 2016/0034356 A1 | 2/2016 | Aron |
| 2017/0242871 A1 | 8/2017 | Kilaru |
| 2019/0250998 A1 | 8/2019 | Bedadala |
| 2019/0384678 A1 | 12/2019 | Samprathi |
| 2021/0081285 A1 | 3/2021 | Charfauros |

\* cited by examiner

INTEGRATED HIERARCHICAL STORAGE MANAGEMENT

CROSS REFERENCE TO OTHER APPLICATIONS

This application is a continuation of U.S. patent application Ser. No. 16/533,356, entitled INTEGRATED HIERARCHICAL STORAGE MANAGEMENT filed Aug. 6, 2019 which is incorporated herein by reference for all purposes, which is a continuation of U.S. patent application Ser. No. 16/115,351, now U.S. Pat. No. 10,416,919, entitled INTEGRATED HIERARCHICAL STORAGE MANAGEMENT filed Aug. 28, 2018 which is incorporated herein by reference for all purposes.

BACKGROUND OF THE INVENTION

Hierarchical storage management (HSM) is a data storage technique that migrates data associated with one or more files between a primary storage system and a secondary storage system. Files that are more frequently accessed are stored on the primary storage system and files that are less frequently accessed are stored on the secondary storage system. A HSM is typically implemented in a stand-alone system separate from the primary storage system and the secondary storage system. The HSM may poll a primary storage system or the secondary storage system for access information associated with files. However, such access information is limited. For example, the access information may only include a timestamp indicating a last access time associated with a file. As a result, the factors used by the HSM in its decision to migrate data associated with one or more files between the primary storage system and secondary storage system is limited.

BRIEF DESCRIPTION OF THE DRAWINGS

Various embodiments of the invention are disclosed in the following detailed description and the accompanying drawings.

DETAILED DESCRIPTION

Figure 1:
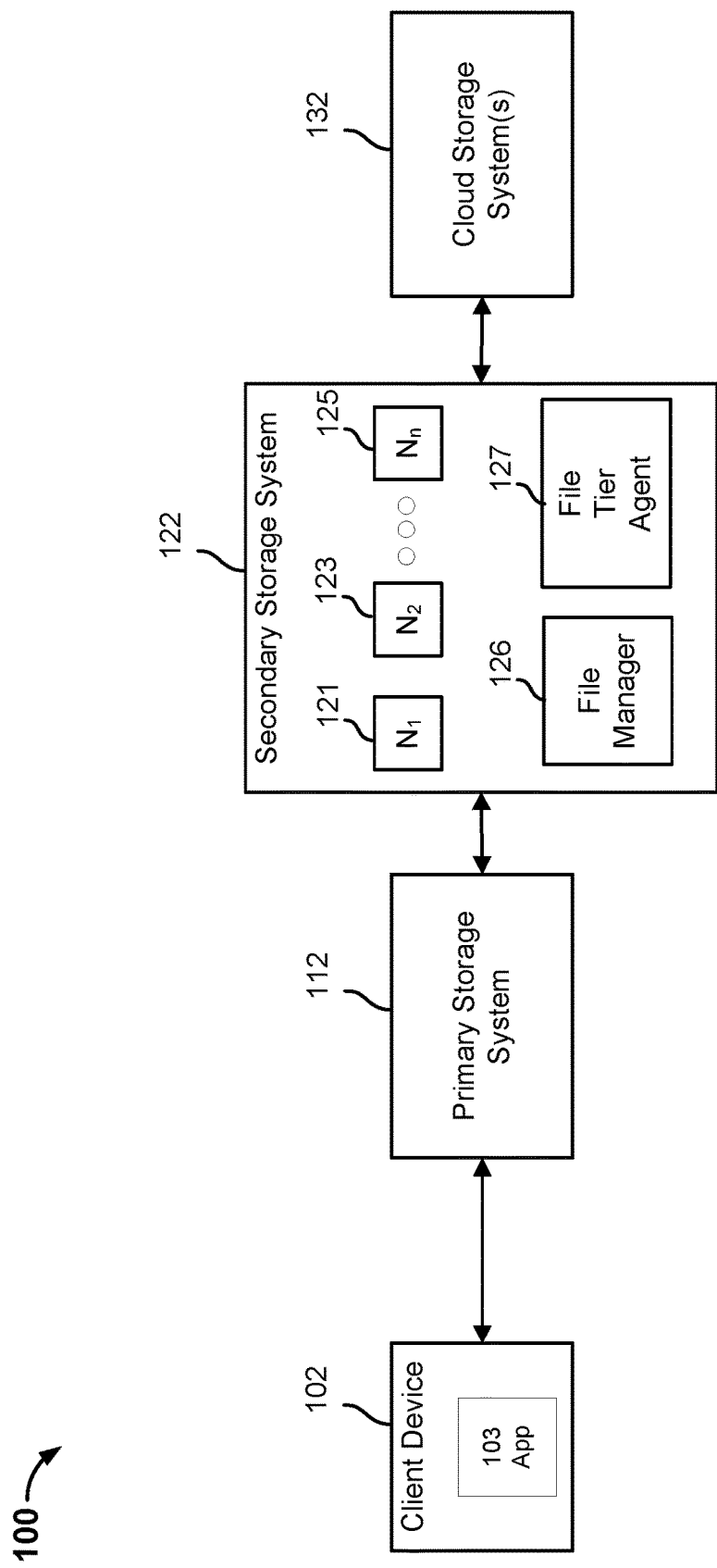
FIG. 1 is a block diagram illustrating an embodiment of a system for migrating data associated with a content file

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A primary storage system may store data associated with one or more content files. A client system may access some of the content files stored on the primary storage system more frequently than some of the other content files stored on the primary storage system. Storing data associated with a content file on the primary storage system is more expensive than storing data associated a content file on a secondary storage system because access to the content file may be provided very fast, but such access speed comes at a storage cost. Storing data on a primary storage system is more expensive than storing the data on a secondary storage system.

For files that are not frequently accessed, conventional systems may migrate an entire file from a primary storage system to a secondary storage system. A client system requesting access to the file may access the file via the secondary storage system without the primary storage system redirecting the request to the secondary storage system. A client system may send a request to the primary storage system for the file, the primary storage system may deny the request and notify the client system to send a request to the secondary storage system for the file, and the client system may send a separate request to the secondary storage system for the file. As a result, the client system experiences a delay in accessing the file and the file access is not seamless. It would be useful for a client system to be able to seamlessly access a content file via primary storage system's file system while reducing the storage costs by storing portions of or the entire content file on a secondary storage system.

Portions of data associated with a content file that are not frequently accessed may be migrated from the primary storage system to the secondary storage system. The portions of data associated with a content file may include some of or the entire content file. A client system may access migrated portions of a content file stored on the secondary storage system via the primary storage system's file system, that is, the client system may access the migrated portions of the content file as if the migrated portions of the content file is stored on the primary storage system. The primary storage system may store a file stub that includes a redirect (e.g., Samba (SMB) widelink, vendor-specific APIs) to the migrated file. The migrated portions of the content file may be stored on a secondary storage system and the file metadata associated with the migrated portions of the content file may be stored on the secondary storage system using a tree data structure. The redirect may include a reference to the tree data structure associated with the portion of the migrated file with which the client system desires access. The redirect may cause the secondary storage system to use the snapshot tree to locate the data associated with the migrated portions of the content file. This enables the secondary storage system to efficiently locate and provide the data associated with the content file. As a result, the client system may access the content file via the primary storage system and not be aware that some or all of the content file is stored on the secondary storage system because the delay in accessing the content file is negligible. The file access is seamless because the client system may access the content file via the primary storage system's file system. Also, the cost of storing the content file on the secondary storage system is less than storing the content file on the primary storage system because the unfrequently accessed portions of a content file may be stored on the secondary storage system while the more frequently accessed portions of the content file, if any, may be stored on the primary storage system.

A secondary storage system may store portions of a plurality of content files that are not frequently accessed (e.g., cold data) by one or more client devices. The portions of the plurality of content files may include an entire content file or portions of a content file. The secondary storage system may include a file tier agent. Instead of using a stand-alone HSM, a file tier agent (i.e., an integrated HSM) may provide a secondary storage system with a number of benefits. For example, the file tier agent may maintain more detailed statistics associated with the portions of the plurality of content files stored on the secondary storage system than is possible with a stand-alone HSM. Since a secondary storage system is configured receive file access requests associated with the portions of the plurality of content files stored on the secondary storage system, the secondary storage system has access to file information beyond a last file access timestamp. For example, the secondary storage system may maintain time-series data of all access events associated with portions of a content file stored on the secondary storage system. A file tier agent is able to determine statistics associated with a content file, such as the number of times the content file was accessed in the last day, last week, last month, last six months, etc. The file tier agent is also able to determine access patterns associated with portions of the plurality of content files stored on the secondary storage system. For example, the file tier agent may determine that a content file (e.g., tax documents) is more frequently accessed between the months of January and April than the rest of the year. Such patterns may be used to migrate data associated with portions of a content file from the secondary storage system back to the primary storage system.

The time-series data of all access events associated with the content files stored on a secondary storage system enables the file tier agent to implement a plurality of migration policies for content files. The file tier agent may implement a policy to migrate data associated with a content file from a primary storage system to a secondary storage system. The file tier agent may poll the primary storage system for access information associated with a content file. For example, the primary storage system may provide information, such as a last access time associated with a content file. In some embodiments, a file tier client is installed on the primary storage system. The file tier client may communicate with the file tier agent on the secondary storage system and provide time-series data of all access events associated with the plurality of content files stored on the primary storage system. In some embodiments, the file tire client determines portions of a content file that are frequently accessed and other portions of the content file that are not frequently accessed. In some embodiments, a portion of a content file may be migrated to the secondary storage system (e.g., the "cold" portion) and the other portion of the content file may remain on the primary storage system (e.g., the "hot" portion). For example, a portion of a database file may be frequently accessed by a client system, but other portions of the database file may be infrequently accessed. The infrequently accessed portions may be migrated to the secondary storage system while the frequently accessed portions remain stored on the primary storage system.

The file tier agent may implement a policy to migrate data associated with a content file from the secondary storage system to the primary storage system. For example, data associated with a content file (e.g., tax document) may be stored on the secondary storage system. The data associated with the content file may be migrated to the primary storage system for a period when the content file is likely to be frequently accessed (e.g., January to April). The data associated with a content file may be migrated to the primary storage system in the event the content file is accessed more than a threshold number of times within a particular time period (e.g. more than three times in a week). In some embodiments, a portion of a content file may be migrated back to the primary storage system (e.g., the "hot" portion) and the other portion of the content file may remain on the secondary storage system (e.g., the "cold" portion). In some embodiments, the entire content file may be migrated back to the primary storage system.

The file tier agent may implement a policy to migrate data associated with a content file from the secondary storage system to a cloud storage system. A content file stored on the secondary storage system may not be accessed for a threshold number of times within a threshold time period (e.g., one access within a two year period). For example, an enterprise may be required to maintain content files for legal compliance purposes, but the content files are never accessed. The data associated with such content files may be migrated from the secondary storage system to the cloud storage system. A portion of a content file may be migrated to the cloud storage system (e.g., the "colder" portion) and the other portion of the content file may remain on the secondary storage system (e.g., the "cold" portion). The entire content file may be migrated to the cloud storage system.

The file tier agent may implement a policy to migrate data associated with a content file from the cloud storage system to the secondary storage system or the primary storage system. A content file stored in the cloud storage system may be accessed for a threshold number of times within a threshold time period (e.g., two accesses within a one year period). The data associated with such content files may be migrated from the cloud storage system to the secondary storage system or the primary storage system, depending upon the frequency of access. The policy may implement two separate access thresholds. For example, in the event a content file stored in the cloud storage system is accessed more than a first threshold, but less than a second threshold, the data associated with the content file may be migrated from the cloud storage system to the secondary storage system. In the event a content file stored in the cloud storage system is access more than a first threshold and more than a second threshold, the data associated with the content file may be migrated from the cloud storage system to the primary storage system. A portion of a content file may be migrated back to the primary storage system (e.g., the "hot" portion) or the secondary storage system (e.g., the "cold" portion" and the other portion of the content file may remain on the cloud storage system (e.g., the "colder" portion). In other embodiments, the entire content file is migrated back to the primary storage system or the secondary storage system.

Providing a file tier agent in a secondary storage system provides another benefit because a proxy is not required. A file may be accessed by multiple file systems. Each file system may use different protocols (e.g., windows vs iOS). A standalone HSM is typically specific to a single file system and has to perform translations for different file systems. For example, a stand-alone HSM may separately communicate with a primary storage system and a secondary storage system. The primary storage system may use a different protocol than the secondary storage system. The stand-alone HSM may act as a proxy and translate between the different protocols. The stand-alone HSM becomes a bottleneck because it has to translate between the different protocols in order to cause data associated with a file to be migrated from the primary storage system to the secondary storage system. In contrast, providing a file tier agent in the secondary storage system removes the bottleneck because the secondary storage system may be configured to communicate using different protocols. For example, there are different primary storage systems that use different protocols. The secondary storage system may support the different protocols and send commands to the primary storage system using the protocol of the primary storage system. This reduces the amount of time needed to initiate the migration of data associated with a content file from the primary storage system to the secondary storage system.

FIG. 1 is a block diagram illustrating an embodiment of a system for migrating data associated with a content file. In the example shown, system 100 includes a client device 102, a primary storage system 112, a secondary storage system 122, and one or more cloud storage systems 132. In some embodiments, a content file may be stored in one of the primary storage system 112, secondary storage system 122, and/or the one or more cloud storage systems 132. In other embodiments, portions of a content file are stored across the primary storage system 112, secondary storage system 122, and/or the one or more cloud storage systems 132.

Client device 102 may be a mobile phone, a smart phone, a tablet, a laptop computer, a desktop computer, a server, a smart watch, etc. Client device 102 includes an application 103. Application 103 may send a request for a content file to primary storage system 112. The request may be sent via a network connection. The network connection may be wired or wireless. The network may be the Internet, an intranet, a local area network, a home area network, a wide area network, a cellular network, a virtual private network, etc. In some embodiments, the data associated with the requested file is stored on primary storage system 112. In response to the request, primary storage system 112 may provide the data associated with the content file. In other embodiments, the data associated the requested file is stored on primary storage system 122 or one of the one or more cloud storage systems 132. Primary storage system 112 may store a file stub for the requested file. The file stub may redirect the request to a storage system storing the data associated with the requested file. The redirect may include a reference to the tree data structure associated with the portion of the migrated file with which the client system desires access. The redirect may cause the secondary storage system to use a tree data structure (e.g., snapshot tree and a file tree corresponding to the migrated portions of the content file) to locate the data associated with the migrated portions of the content file. This enables the secondary storage system to efficiently locate and provide the data associated with the content file. Client device 102 may include a display or be associated with a display to the requested file.

Primary storage system 112 is a computing system that stores content file data. Primary storage system 112 may be comprised of one or more servers, one or more computing devices, one or more storage devices, and/or a combination thereof. Primary storage system 112 may store file metadata associated with the plurality of content files stored on primary storage system 112. The file metadata associated with a content file may include a timestamp indicating a last time the content file was accessed. Primary storage system 112 may receive from a secondary storage system a request for the file metadata associated with a plurality of content files indicating a last time a corresponding content file was accessed. Primary storage system 112 may provide such information in response to the request. Primary storage system 112 may receive a request for data associated with one or more content files. A requested file may correspond to a content file that is stored on primary storage system 112, but not frequently accessed. Primary storage system 112 may migrate the data associated with a content file to a secondary storage system. The migrated data may include some or of all of the data associated with a content file.

Primary storage system 112 may include a file tier client (not shown). The file tier client may communicate with file tier agent 127 on secondary storage system 122 and provide time-series data of a plurality of access events associated with the portions of the plurality of content files stored on the primary storage system. The file tier client may determine which portions of a content file are frequently accessed.

Secondary storage system 122 is a storage system configured to store content file data received from primary storage system 112. The content file data may include some of or an entire content file. Secondary storage system 122 may protect a large volume of applications while supporting tight business requirements (recovery time objective (RTO) and recovery point objective (RPO)). Secondary storage system 122 may unify end-to-end protection infrastructure—including target storage, provide backup, replication of data, disaster recovery, and/or cloud tiering. Secondary storage system 122 may provide scale-out, globally deduped, highly available storage to consolidate all secondary data, including backups, files, and test/dev copies. Secondary storage system 122 simplifies backup infrastructure and eliminates the need to run separate backup software, proxies, media servers, and archival. Secondary storage system 122 may be fully integrated with a virtual machine (VM) centralized management tool, such as vCenter, and an applications programming interface (API) for data protection. Secondary storage system 122 may reduce the amount of time to perform RPOs and support instantaneous RTOs by creating a clone of a backup VM and running the VM directly from secondary storage system 122. Secondary storage system 122 may integrate natively with one or more cloud servers. Secondary storage system 122 may replicate data to a one or more cloud clusters to minimize potential data loss by replicating data as soon as a backup is completed. This allows data in the cloud to be used for disaster recovery, application migration, test/dev, or analytics.

Secondary storage system 122 may be comprised of one or more storage nodes 121, 123, 127. The one or more storage nodes may be one or more solid state drives, one or more hard disk drives, or a combination thereof. Secondary storage system 122 may receive data associated with a content file and store the data associated with the content file across one or more of the storage nodes 121, 123, 127.

Secondary storage system 122 includes file tier agent 127. Secondary storage system 122 is configured receive file access requests associated with the portions of the plurality of content files stored on the secondary storage system 122. Secondary storage system 122 has access to file information beyond a last file access timestamp associated with a file. Secondary storage system 127 may maintain time-series data of all access events associated with the portions of a content file stored on secondary storage system 127. File tier agent 127 has access to such information and is configured to determine statistics associated with the portions of a content file, such as the number of times the portion of a content file was accessed in the last day, last week, last month, last six months, etc. File tier agent 127 is also configured to determine access patterns associated with the portions of the plurality of files stored on secondary storage system 122. For example, file tier agent 127 may determine that a content file (e.g., tax documents) is more frequently accessed between the months of January and April than the rest of the year.

The time-series data of all access events associated with the content files stored on secondary storage system 122 enables file tier agent 127 to implement a plurality of migration policies for files. File tier agent 127 may implement a policy to migrate data associated with a content file from a primary storage system to a secondary storage system. File tier agent 127 may poll primary storage system 102 for access information associated with a content file. For example, primary storage system 102 may provide information, such as a last access time associated with a content file.

File tier agent 127 may implement a policy to migrate data associated with a content file from secondary storage system 122 to primary storage system 112. For example, data associated with a content file (e.g., tax document) may be stored on secondary storage system 122. The data associated with the content file may be migrated to primary storage system 112 for a period when the content file is likely to be frequently accessed (e.g., January to April). The data associated with a content file may be migrated to primary storage system 112 in the event the content file is access more than a threshold number of times within a specific period. The data associated with the content file may include some or all of a content file.

File tier agent 127 may implement a policy to migrate data associated with a content file from secondary storage system 122 to one of the one or more cloud storage system 132. A file stored on secondary storage system 122 may not be accessed for a threshold number of times within a threshold time period (e.g., one access within a two year period). For example, an enterprise may be required to maintain files for legal compliance purposes, but the content files are never accessed. The data associated with such content files may be migrated from secondary storage system 122 to one of the one or more cloud storage systems 132. The data associated with the content file may include some or all of a content file.

File tier agent 127 may implement a policy to migrate data associated with a content file from one of the one or more cloud storage system 132 to secondary storage system 122 or primary storage system 112. A content file stored in cloud storage system 132 may be accessed for a threshold number of times within a threshold time period (e.g., two accesses within a one year period). The data associated with such content files may be migrated from cloud storage system 132 to secondary storage system 122 or primary storage system 112, depending upon the frequency of access. The policy may implement two separate access thresholds. For example, in the event a content file stored in one of the one or more cloud storage systems 132 is accessed more than a first threshold, but less than a second threshold, the data associated with the content file may be migrated from cloud storage system 132 to secondary storage system 122. In the event a content file stored in one of the one or more cloud storage systems 132 is accessed more than a first threshold and more than a second threshold, the data associated with the content file may be migrated from cloud storage system 132 to primary storage system 112. The data associated with the content file may include some or all of a content file.

Secondary storage system 122 may receive a backup from primary storage system 112 and store content file data associated with the backup across a plurality of storage nodes. The backup may be comprised of data associated with one or more content files. The one or more content files may correspond to files that are not frequently accessed on primary storage system 112 (e.g., cold file). File system manager 126 may organize the data associated with the one or more content files using a tree data structure. An example of the tree data structure is a snapshot tree (e.g., Cohesity Snaptree), which may be based on a B+ tree structure (or other type of tree structure in other embodiments). The tree data structure provides a view of the content file data corresponding to the backup. The view of the content file data corresponding to the backup is comprised of a snapshot tree and a plurality of file trees (e.g., Blob structures). A file tree is a metadata structure that stores the file metadata associated with a content file.

A snapshot tree includes a root node, one or more levels of one or more intermediate nodes associated with the root node, and one or more leaf nodes associated with an intermediate node of the lowest intermediate level. The root node of a snapshot tree includes one or more pointers to one or more intermediate nodes. Each intermediate node includes one or more pointers to other nodes (e.g., a lower intermediate node or a leaf node). A leaf node may store file system metadata, file metadata associated with a content file that is less than or equal to a limit size (e.g., 256 kB), an identifier of a data brick, a pointer to a file tree (e.g., Blob structure), or a pointer to a data chunk stored on the secondary storage system. A leaf node may correspond to a data brick. The data brick may have a corresponding brick number.

The tree data structure may be used to capture different versions of backups. The tree data structure allows a chain of snapshot trees corresponding to different versions of backup (i.e., different snapshot tree versions) to be linked together by allowing a node of a later version of a snapshot tree to reference a node of a previous version of a snapshot tree (e.g., a "snapshot tree forest"). For example, a root node or an intermediate node of the second snapshot tree corresponding to the second backup may reference an intermediate node or leaf node of the first snapshot tree corresponding to a first backup. As a result, content files that are migrated from primary storage 112 to secondary storage 122, regardless of when they are backed up, may be accessed by client system 102.

File metadata associated with a content file that is greater than the limit size (e.g., 256 kB) has an associated file tree. The file tree is a metadata structure and is configured to store the file metadata associated with a content file. The file tree is stored in storage as a file separate from the content file. The file tree includes a root node, one or more levels of one or more intermediate nodes associated with the root node, and one or more leaf nodes associated with an intermediate node of the lowest intermediate level. A file tree is similar to a snapshot tree, but a leaf node of a file tree includes an identifier of a data brick storing one or more data chunks of the content file or a pointer to the data brick storing one or more data chunks of the content file. The location of the data brick may be identified using a table stored in a metadata store that matches brick numbers to a physical storage location or the location of the data brick may be identified based on the pointer to the data brick. A leaf node of a snapshot tree corresponding to a view of the content file data may include a pointer to the root node of the file tree.

Client system 102 may access a migrated portions of a content file stored on secondary storage system 122 via primary storage system 112. The portions may include some of or the entire content file. Primary storage system 112 may store a file stub that includes a redirect (e.g., SMB widelink, vendor-specific APIs) to the migrated portions of the content file. The file stub may include a reference to the snapshot tree associated with the portion of the migrated file with which the client system desires access. The redirect may cause the secondary storage system to use the snapshot tree to locate the data associated with the migrated portions of the content file. The migrated portions of the content file may be stored on secondary storage system 122 and the file metadata associated with the content file may be stored using a snapshot tree. This enables file manager 126 to efficiently locate and provide the data associated with the content file. As a result, client system 102 may access the content file via primary storage system 112 and not be aware that the content file is stored on secondary storage system 122 because there is a negligible delay in accessing the content file.

One or more cloud storage systems 132 may be a public cloud storage provider (e.g., Amazon Web Services, Microsoft Azure Blob Storage, Google Cloud Storage, etc.). the one or more cloud storage systems 132 are configured to receive and store data associated with one or more content files. In some embodiments, the data associated with one or more content files may be requested from one of the one or more cloud storage systems 132 and provided to a requesting system. The requesting system may be client system 102. Client system 102 may send a request for a content file to primary storage system 112. Primary storage system 112 may store a file stub for the requested content file. The file stub may redirect client system 102 to one of the one or more cloud storage systems 132. In other embodiments, the data associated with one or more content files stored on the one or more cloud storage systems 132 may be migrated back to either primary storage system 112 or secondary storage system 122.

Figure 2A:
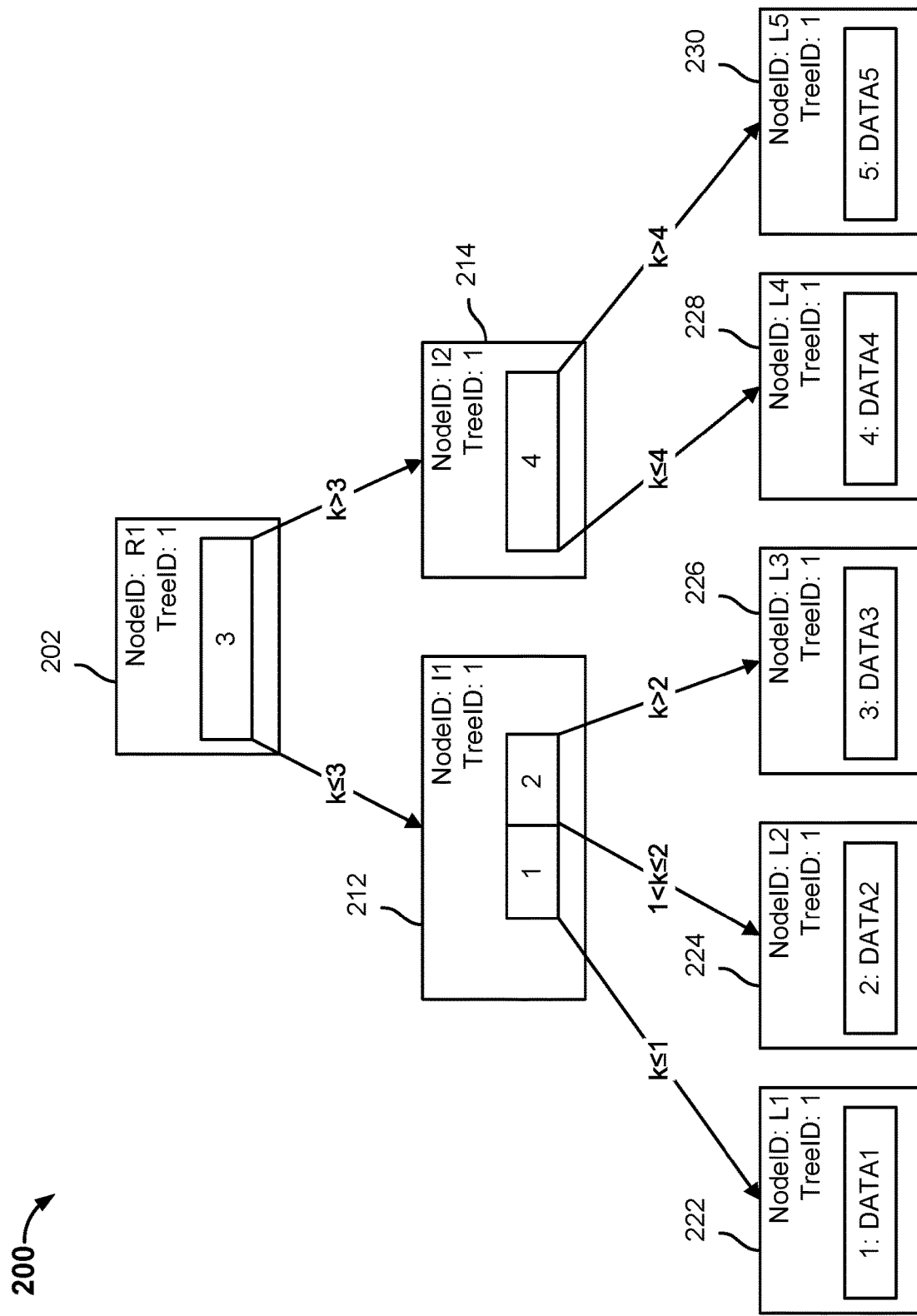
FIG. 2A is a block diagram illustrating an embodiment of a tree data structure.

FIG. 2A is a block diagram illustrating an embodiment of a tree data structure. A tree data structure may be used to represent the content file data that is stored on a secondary storage system, such as secondary storage system 122. The content file data may include metadata for a distributed file system and may include information, such as chunk identifier, chunk offset, file size, directory structure, file permissions, physical storage locations of the content files, etc. A file system manager, such as file system manager 126, may generate tree data structure 200.

Tree data structure 200 is comprised of a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup of content file data at a particular point in time t, for example at time $t_0$. The backup may be received from a primary storage system, such as primary storage system 112. The backup may be comprised of one or more files that were not frequently accessed when they were stored on primary storage system 112. The snapshot tree in conjunction with a plurality of file trees may provide a complete view of the backup for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node at the bottom of a snapshot tree. Each node of the tree structure includes a view identifier of a view with which the node is associated (e.g., TreeID).

A leaf node may be configured to store key-value pairs of content file data. A data key k is a lookup value by which a particular leaf node may be accessed. For example, "1" is a data key that may be used to lookup "DATA1" of leaf node 222. The data key k may correspond to a brick number of a data brick. A data brick may be comprised of one or more data blocks. In some embodiments, the leaf node is configured to store file system metadata (e.g., chunk identifier (e.g., hash value, SHA-1, etc.), file size, directory structure, file permissions, physical storage locations of the files, etc.). A leaf node may store a data key k and a pointer to a location that stores the value associated with the data key.

In other embodiments, a leaf node is configured to store the actual data when the file metadata associated with a content file is less than or equal to a limit size. For example, file metadata associated with a content file that is less than or equal to 256 kB may reside in the leaf node of a snapshot tree. In some embodiments, a leaf node includes a pointer to a file tree (e.g., blob structure) when the size of the file metadata associated with a content file is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2", and "3" are less than or equal to the node key "3." To find a leaf node storing a value associated with a data key of "4" or "5," the second branch of root node 202 would be traversed to intermediate node 214 because data keys "4" and "5" are greater than the node key of "3."

In some embodiments, a hash function may determine which branch of a node with which the non-numerical key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "3." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the view/backup with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1", "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead the node with a data key of "5."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store file metadata associated with a content file. In other embodiments, leaf node 222 is configured to store a pointer to a file tree (e.g., blob structure).

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store file metadata associated with a content file. In other embodiments, leaf node 224 is configured to store a pointer to a file tree (e.g., blob structure).

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store file metadata associated with a content file. In other embodiments, leaf node 226 is configured to store a pointer to a file tree (e.g., blob structure).

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228. In some embodiments, leaf node 228 is configured to store file metadata associated with a content file. In other embodiments, leaf node 228 is configured to store a pointer to a file tree (e.g., blob structure).

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230. In some embodiments, leaf node 230 is configured to store file metadata associated with a content file. In other embodiments, leaf node 230 is configured to store a pointer to a file tree (e.g., blob structure).

Figure 2B:
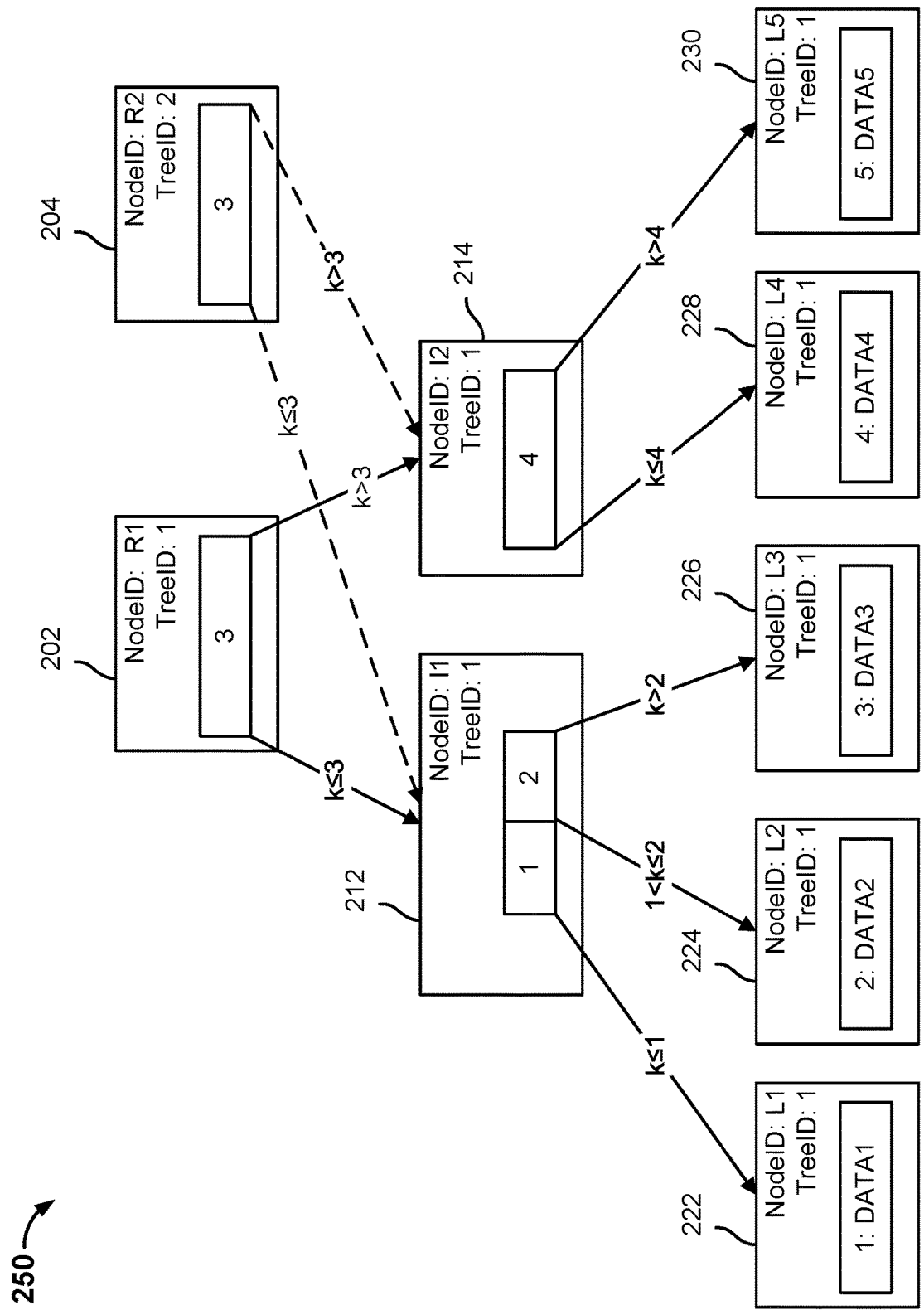
FIG. 2B is a block diagram illustrating an embodiment of a cloned snapshot tree.

FIG. 2B is a block diagram illustrating an embodiment of a cloned snapshot tree. A snapshot tree may be cloned when a snapshot tree is added to a tree data structure. In some embodiments, tree data structure 250 may be created by a storage system, such as secondary storage system 122. The content file data of a primary storage system, such as primary storage system 102, may be migrated to a secondary storage system, such as secondary storage system 122. For example, data associated with a content file may be migrated to a secondary storage system in the event the content file is not frequently accessed (e.g., accessed more than a threshold number of times within a particular period of time) on the primary storage system. Each time a backup is performed, a snapshot tree may be added to the tree data structure. The manner in which the content file data corresponding to the subsequent backup is stored in secondary storage system may be represented by a tree data structure. The tree data structure corresponding to the subsequent backup is created by cloning a snapshot tree associated with a last backup.

In the example shown, tree data structure 250 includes root nodes 202, 204, intermediate nodes 212, 214, and leaf nodes 222, 224, 226, 228, and 230. Tree data structure 250 may be a snapshot of content file data that is backed up at a particular point in time t+n. The tree data structure can be used to capture different versions of content file data at different moments in time. The tree data structure may also efficiently locate desired metadata by traversing a particular version of a snapshot tree included in the tree data structure. In some embodiments, the tree data structure allows a chain of backup snapshot versions (i.e., snapshot trees) to be linked together by allowing a node of a later version of a snapshot tree to reference a node of a previous version of a snapshot tree. For example, a snapshot tree with root node 204 is linked to a snapshot tree with root node 202. Each time a backup is performed, a new root node may be created and the new root node includes the same set of pointers included in the previous root node, that is the new root node of the backup may be linked to one or more intermediate nodes associated with a previous backup. The new root node also includes a different NodeID and a different TreeID. The TreeID is the view identifier associated with a view of the primary system associated with the backup for the particular moment in time.

In some embodiments, a root node is associated with a current view of the content file data. A current view may still accept one or more changes to the data. The TreeID of a root node indicates a backup with which the root node is associated. For example, root node 202 with a TreeID of "1" is associated with a first backup and root node 204 with a TreeID of "2" is associated with a second backup. In the example shown, root node 204 is associated with a current view of the content file data. A snapshot tree may be a current view until a subsequent backup is performed.

In other embodiments, a root node is associated with a snapshot view of the content file data. A snapshot view may represent a state of the content file data at a particular moment in time in the past and is not updated. In the example shown, root node 202 is associated with a snapshot view of the file system data.

In the example shown, root node 204 is a copy of root node 202. Similar to root node 202, root node 204 includes the same pointers as root node 202. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "4" or "5." Root node 204 includes a NodeID of "R2" and a TreeID of "2." The NodeID identifies the name of the node. The TreeID identifies the view/backup with which the node is associated.

Figure 2C:
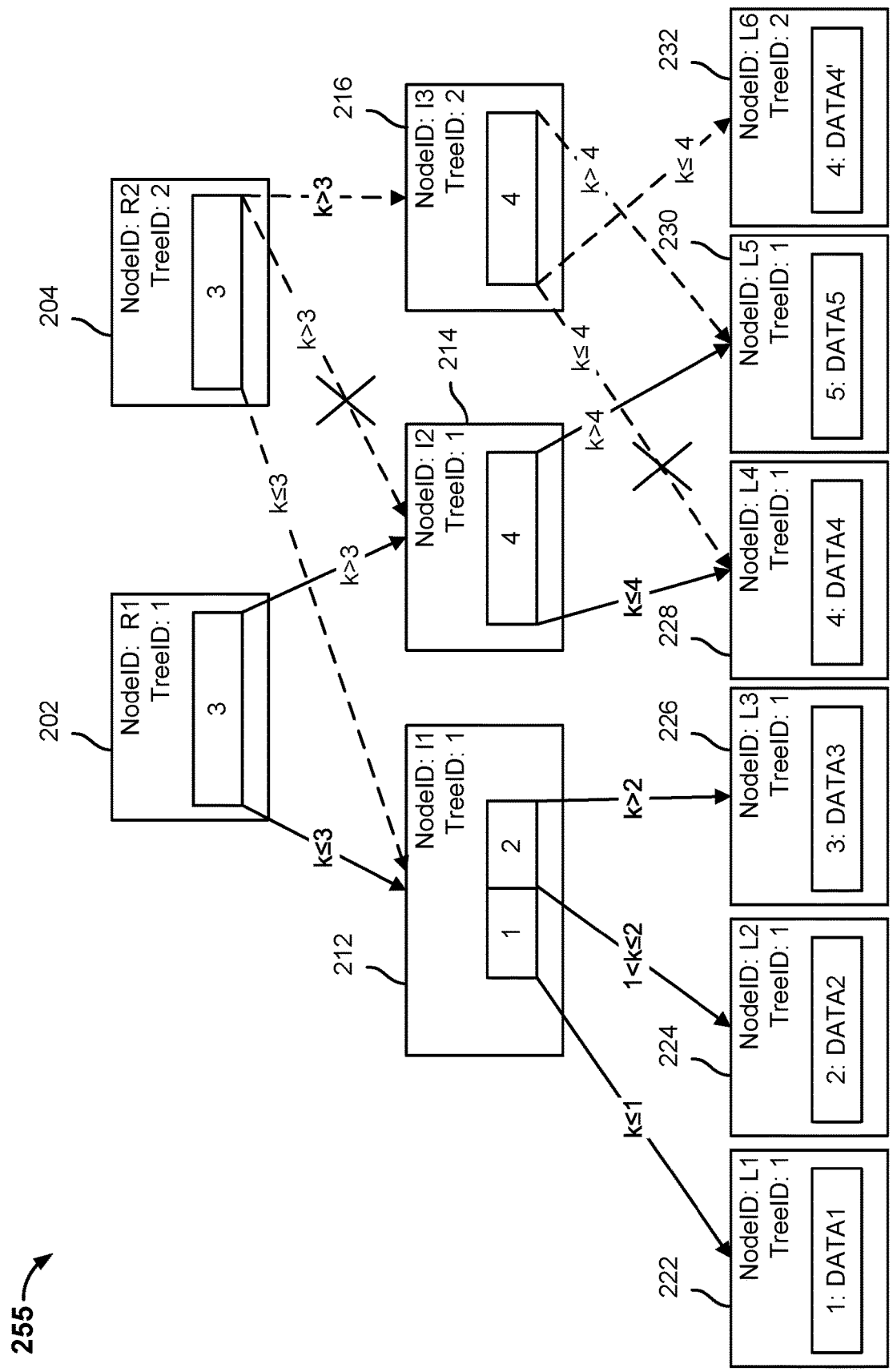
FIG. 2C is a block diagram illustrating an embodiment of modifying a snapshot tree.

FIG. 2C is a block diagram illustrating an embodiment of modifying a snapshot tree. In the example shown, tree data structure 255 may be modified by a file system manager, such as file system manager 126. A snapshot tree with a root node 204 may be a current view of the content file data at time t+n+m, for example, at time $t_2$. A current view represents a state of the content file data that is up-to-date and capable of receiving one or more modifications to the snapshot tree that correspond to modifications to the content file data. Because a snapshot represents a perspective of the content file data that is "frozen" in time, one or more copies of one or more nodes affected by a change to content file data, are made.

In the example shown, the value "DATA4" has been modified to be "DATA4'." In some embodiments, the value of a key value pair has been modified. In other embodiments, the value of the key pair is the data of file metadata associated with a content file that is smaller than or equal to a limit size. In other embodiments, the value of the key value pair points to a different file tree. The different file tree may be a modified version of the file tree that the leaf node previously pointed.

At $t_2$, the file system manager starts at root node 204 because that is the root node associated with snapshot tree at time $t_2$. The value "DATA4" is associated with the data key "4." The file system manager traverses snapshot tree 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

In some embodiments, leaf node 232 stores the value of a key value pair that has been modified. In other embodiments, leaf node 232 stores the modified data of file metadata associated with a content file that is smaller than or equal to a limit size. In other embodiments, leaf node 232 stores a pointer to a file tree corresponding to the modified file that is less than or equal to a threshold size. In other embodiments, leaf node 232 stores a pointer to a file tree corresponding to the modified file that is greater than a threshold size.

Figure 2D:
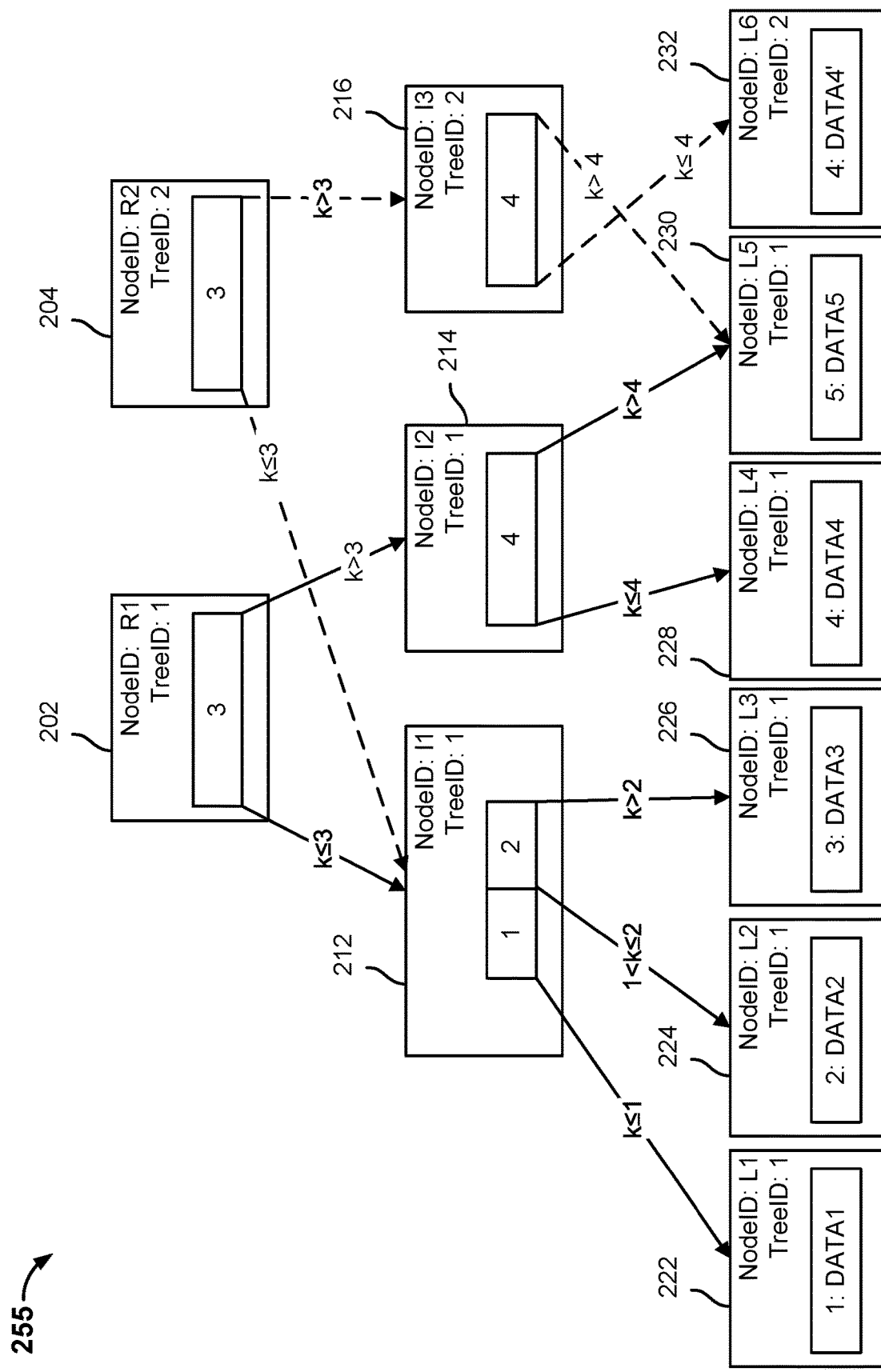
FIG. 2D is a block diagram illustrating an embodiment of a modified snapshot tree.

FIG. 2D is a block diagram illustrating an embodiment of a modified snapshot tree. Tree data structure 255 shown in FIG. 2D illustrates a result of the modifications made to a snapshot tree as described with respect to FIG. 2C.

Figure 2E:
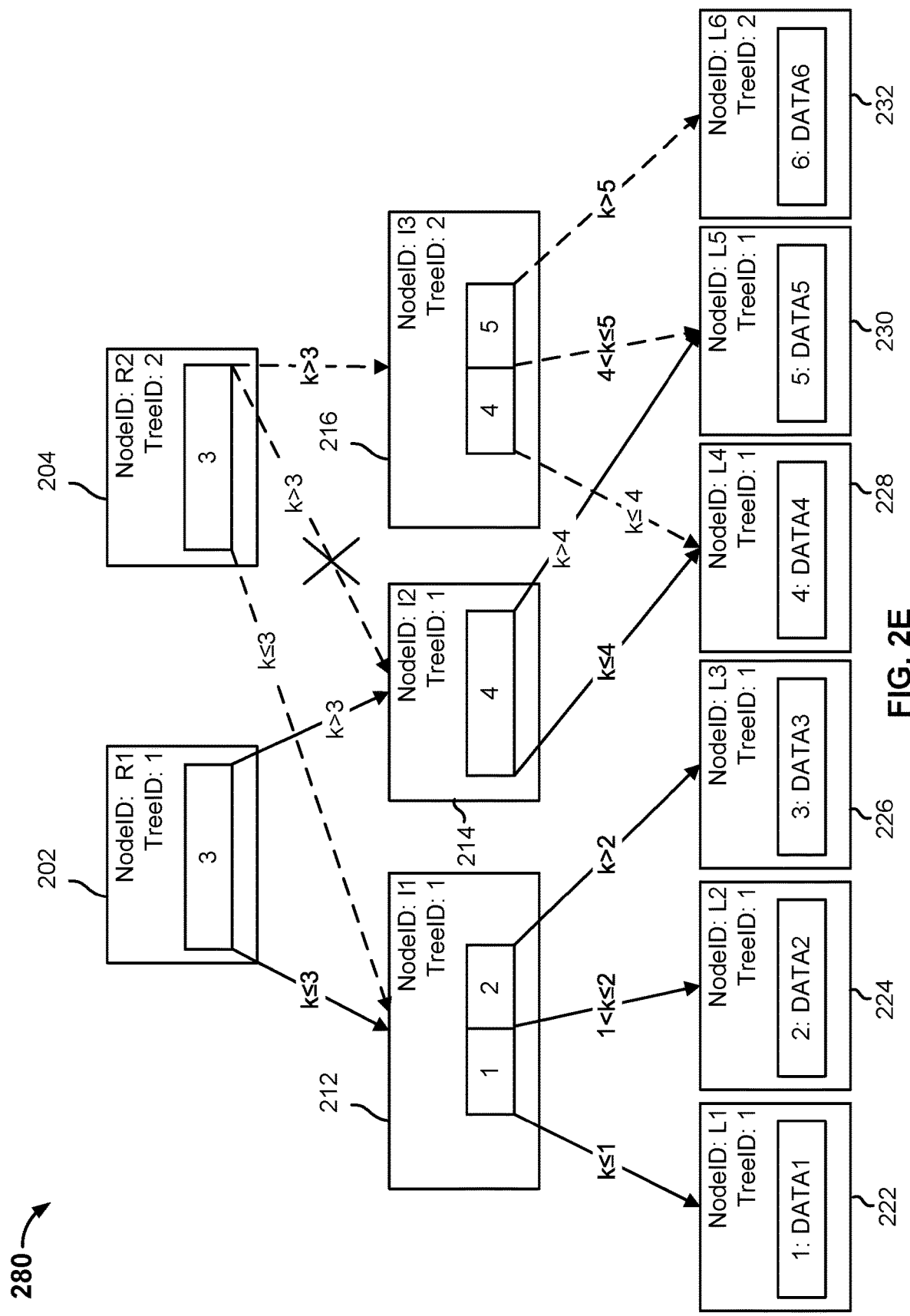
FIG. 2E is a block diagram illustrating an embodiment of a modified snapshot tree.

FIG. 2E is a block diagram illustrating an embodiment of a modified snapshot tree. In the example shown, tree data structure 280 may be modified by a file system manager, such as file system manager 126. A snapshot tree may be modified when one or more new content files are included in a backup and are to be stored on the secondary storage system.

In the example shown, a content file has been backed up to secondary storage system. At $t_2$, to represent the data associated with the content file being backed up to the secondary storage system, a file system manager updates a tree data structure to reflect this change. The file system manager starts at root node 204 because that is the root node associated with snapshot tree at time $t_2$ (i.e., a backup was performed at $t_2$). The value "DATA6" is associated with the data key "6." This is a new key-value pair that is to be stored by the secondary storage system. The file system manager traverses snapshot tree 280 from root node 204 until it reaches a target node, in this example, leaf node 232. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "6," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. In some embodiments, the intermediate node copy 216 includes the same set of pointers as intermediate node 214, but includes a TreeID of "2" to match the TreeID of root node 204. In other embodiments, the intermediate node copy 216 includes the same set of pointers as intermediate node 214 and includes one or more additional pointers corresponding to the one or more leaf nodes being added to the snapshot tree. Intermediate node copy 216 includes a TreeID of "2" to match the TreeID of root node 204.

The file system manager updates a pointer of root node 204 to point to intermediate node 216 instead of pointing to intermediate node 214. The file system manager traverses tree data structure 280 from intermediate node 216 to either leaf nodes 228,230, determines that the TreeID of either leaf nodes 228, 230 do not match the TreeID of root node 204, and creates a new leaf node 232. Leaf node 232 stores the value "DATA6" and includes the same TreeID as root node 204. The file system manager updates a pointer of intermediate node 216 to point to leaf node 232 instead of pointing to leaf node 228.

In some embodiments, leaf node 232 stores the file metadata associated with a new content file when the metadata associated with the content file is smaller than a limit size. In other embodiments, leaf node 232 stores a pointer to a file tree corresponding to the new content file when the metadata associated with the content file is greater than or equal to the limit size.

Portions of a content file may migrated to a secondary storage system. The portions may include some of or an entire content file. A client system may request a primary storage system for data associated with the content file. The primary storage system may redirect the request to the secondary storage system. The data associated with the content file may be retrieved by traversing a snapshot tree from a root node to a leaf node of the snapshot tree corresponding to the content file. In some embodiments, file metadata associated with the content file may be stored in the leaf node of the snapshot tree. For example, the file metadata associated with the content file may include an identifier of one or more bricks storing data chunks associated with the content file. In other embodiments, the leaf node of the snapshot tree includes a pointer to a file tree corresponding to the content file. The data associated with the content file may be retrieved by traversing the file tree.

Figure 3A:
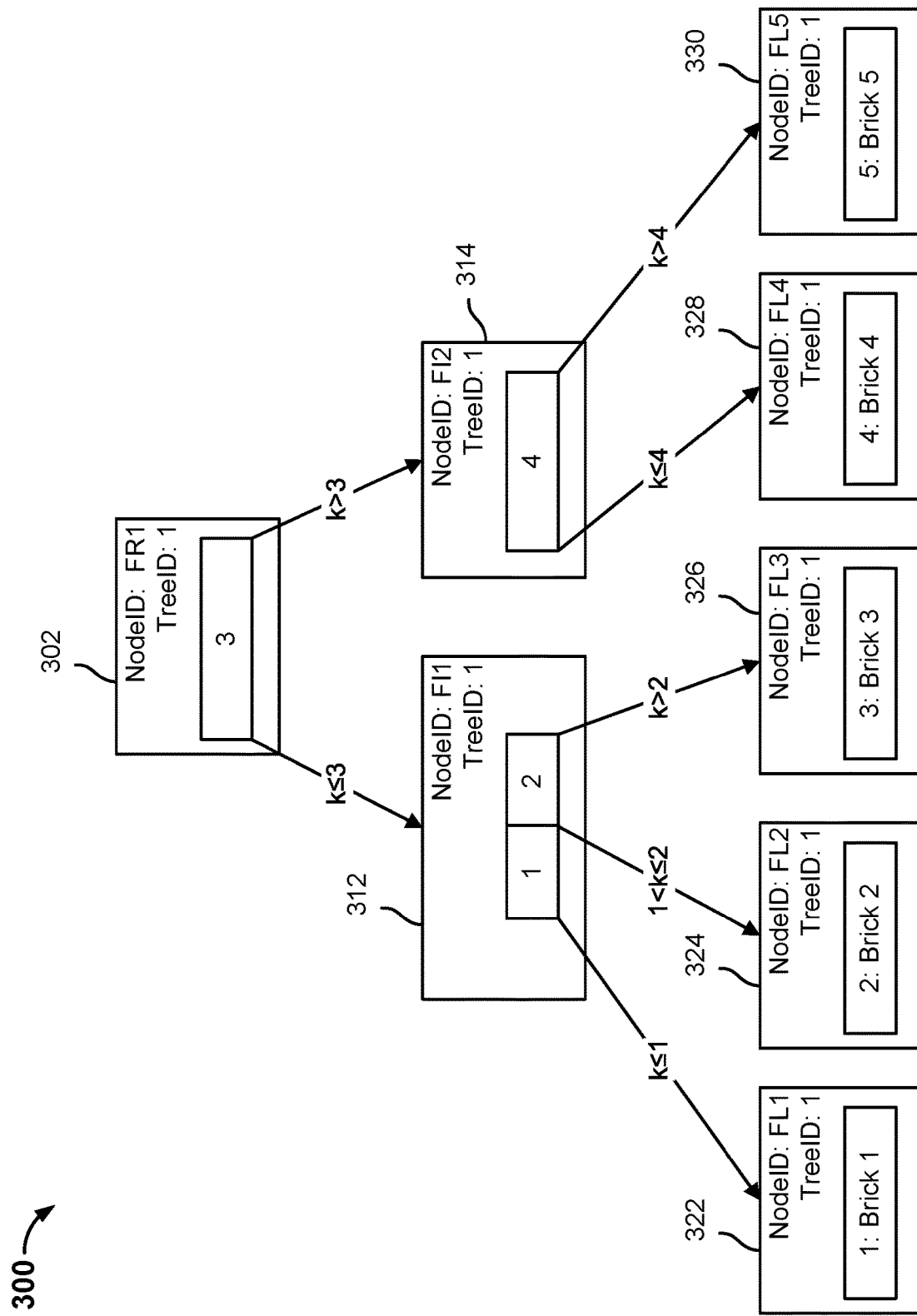
FIG. 3A is a block diagram illustrating an embodiment of a tree data structure.

FIG. 3A is a block diagram illustrating an embodiment of a tree data structure. In some embodiments, tree data structure 300 may be created by a storage system, such as secondary storage system 122. In the example shown, tree data structure 300 corresponds to a content file and stores the file metadata associated with the content file. The file metadata associated with a content file is stored by a storage system as a file separate from the content file with which the metadata is associated, that is, the tree data structure is stored separately from a content file. A leaf node of a snapshot tree associated with content file data, such as a leaf node of tree data structures 200, 250, 255, 280, may include a pointer to a tree data structure corresponding to a file, such as tree data structure 300. A tree data structure corresponding to a content file (i.e., a "file tree") is a snapshot tree, but is used to organize the data blocks associated with a content file that are stored on the secondary storage system. Tree data structure 300 may be referred to as a "metadata structure" or a "file metadata structure."

A tree data structure corresponding to a content file at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time $t_0$. A tree data structure associated with content file data may include one or more pointers to one or more tree data structures corresponding to one or more content files.

In the example shown, tree data structure 300 includes a file root node 302, file intermediate nodes 312, 314, and file leaf nodes 322, 324, 326, 328, 330. Although tree data structure 300 includes one intermediate level between root node 302 and leaf nodes 322, 324, 326, 328, 330, any number of intermediate levels may be implemented. Similar of the snapshot trees described above, each node includes a "NodeID" that identifies the node and a "TreeID" that identifies a view/backup with which the node is associated.

In the example shown, root node 302 includes a pointer to intermediate node 312 and a pointer to intermediate node 314. Root node 202 includes a NodeID of "FR1" and a TreeID of "1." The NodeID identifies the name of the node. The TreeID identifies the backup/view with which the node is associated.

In the example shown, intermediate node 312 includes a pointer to leaf node 322, a pointer to leaf node 324, and a pointer to leaf node 326. Intermediate node 312 includes a NodeID of "FI1" and a TreeID of "1." Intermediate node 312 includes a first node key and a second node key. The data key k for leaf node 322 is a value that is less than or equal to the first node key. The data key for leaf node 324 is a value that is greater than the first node key and less than or equal to the second node key. The data key for leaf node 326 is a value that is greater than the second node key. The pointer to leaf node 322 indicates that traversing tree data structure 300 from intermediate node 312 to leaf node 322 will lead to the node with a data key of "1." The pointer to leaf node 324 indicates that traversing tree data structure 300 from intermediate node 312 to leaf node 324 will lead to the node with a data key of "2." The pointer to leaf node 326 indicates that traversing tree data structure 300 from intermediate node 312 to leaf node 326 will lead to the node with a data key of "3."

In the example shown, intermediate node 314 includes a pointer to leaf node 328 and a pointer to leaf node 330. Intermediate node 314 includes a NodeID of "FI2" and a TreeID of "1." Intermediate node 314 includes a node key. The data key k for leaf node 328 is a value that is less than or equal to the node key. The data key for leaf node 330 is a value that is greater than the node key. The pointer to leaf node 328 indicates that traversing tree data structure 300 from intermediate node 314 to leaf node 328 will lead to the node with a data key of "4." The pointer to leaf node 330 indicates that traversing tree data structure 300 from intermediate node 314 to leaf node 330 will lead the node with a data key of "5."

Leaf node 322 includes a data key-value pair of "1: Brick 1." "Brick 1" may be a brick identifier that identifies the data brick storing one or more data chunks associated with a content file corresponding to tree data structure 300 or a pointer to the data brick storing one or more data chunks associated with a content file corresponding to tree data structure 300. Leaf node 322 includes NodeID of "FL1" and a TreeID of "1." To view the value associated with a data key of "1," tree data structure 300 is traversed from root node 302 to intermediate node 312 to leaf node 322.

Leaf node 324 includes a data key-value pair of "2: Brick 2." "Brick 2" may be a brick identifier that identifies the data brick storing one or more data chunks associated with a content file corresponding to tree data structure 300 or a pointer to the data brick storing one or more data chunks associated with a content file corresponding to tree data structure 300. Leaf node 324 includes NodeID of "FL2" and a TreeID of "1." To view the value associated with a data key of "2," tree data structure 300 is traversed from root node 302 to intermediate node 312 to leaf node 324.

Leaf node 326 includes a data key-value pair of "3: Brick 3." "Brick 3" may be a brick identifier that identifies the data brick storing one or more data chunks associated with a content file corresponding to tree data structure 300 or a pointer to the data brick storing one or more data chunks associated with a content file corresponding to tree data structure 300. Leaf node 326 includes NodeID of "FL3" and a TreeID of "1." To view the value associated with a data key of "3," tree data structure 300 is traversed from root node 302 to intermediate node 312 to leaf node 326.

Leaf node 328 includes a data key-value pair of "4: Brick 4." "Brick 4" may be a brick identifier that identifies the data brick storing one or more data chunks associated with a content file corresponding to tree data structure 300 or a pointer to the data brick storing one or more data chunks associated with a content file corresponding to tree data structure 300. Leaf node 328 includes NodeID of "FL4" and a TreeID of "1." To view the value associated with a data key of "4," tree data structure 300 is traversed from root node 302 to intermediate node 314 to leaf node 328.

Leaf node 330 includes a data key-value pair of "5: Brick 5." "Brick 5" may be a brick identifier that identifies the data brick storing one or more data chunks associated with a content file corresponding to tree data structure 300 or a pointer to the data brick storing one or more data chunks associated with a content file corresponding to tree data structure 300. Leaf node 330 includes NodeID of "FL5" and a TreeID of "1." To view the value associated with a data key of "5," tree data structure 300 is traversed from root node 302 to intermediate node 314 to leaf node 330.

A content file may be comprised of a plurality of data chunks. A brick may store one or more data chunks. In the example shown, leaf nodes 322, 324, 326, 328, 330 each store a corresponding brick identifier. A metadata store may include a data structure that matches a brick identifier with a corresponding location (physical location) of the one or more data chunks comprising the brick. The metadata store may also include a data structure that matches file trees to their corresponding content files.

Figure 3B:
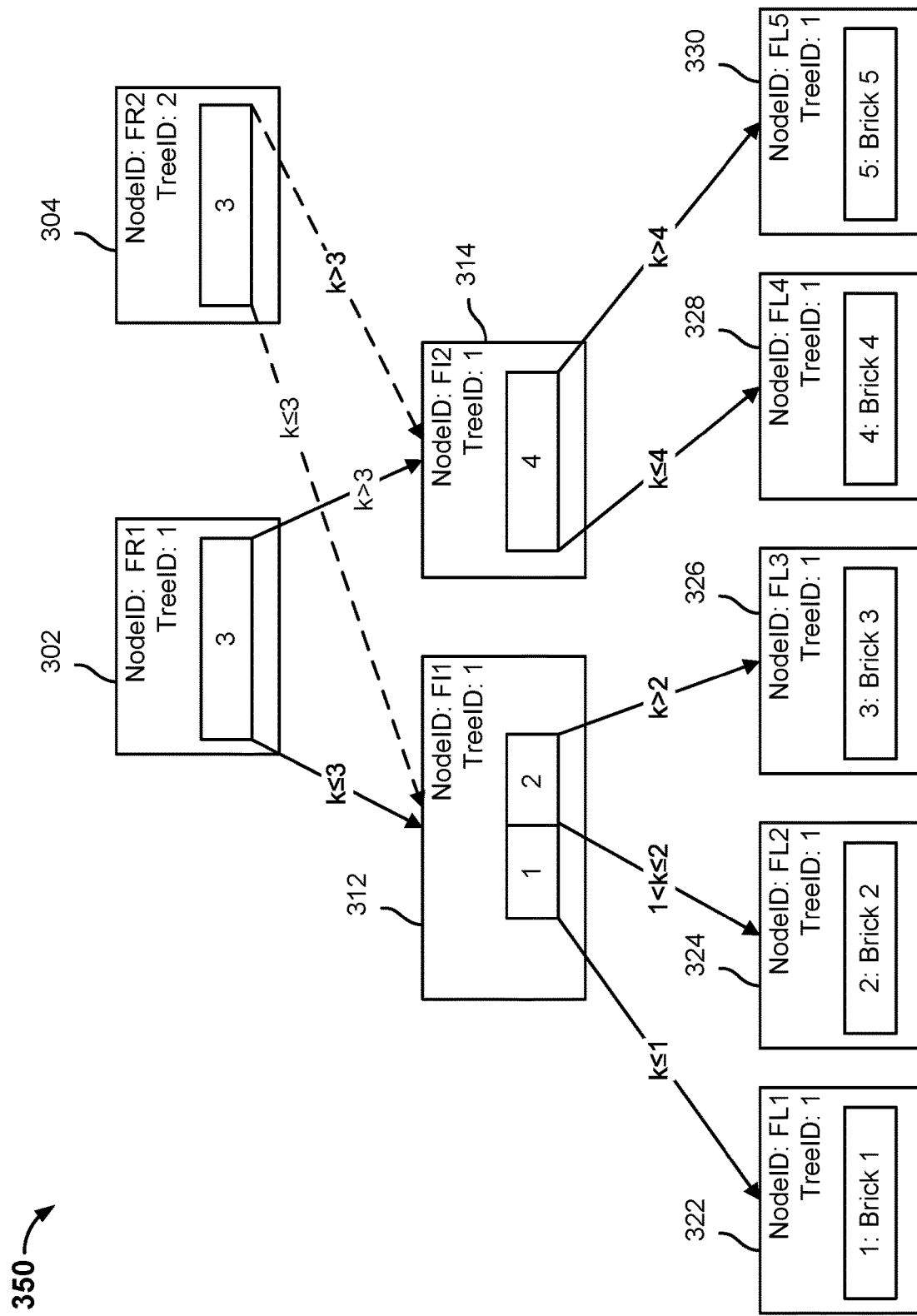
FIG. 3B is a block diagram illustrating an embodiment of adding a file tree to a tree data structure.

FIG. 3B is a block diagram illustrating an embodiment of adding a file tree to a tree data structure. In some embodiments, tree data structure 350 may be created by a storage system, such as secondary storage system 122. A tree data structure corresponding to a content file is a snapshot tree, but stores the file metadata associated with the content file. The tree data structure corresponding to a content file can be used to capture different versions of the content file at different moments in time. In some embodiments, the tree data structure allows a chain of file trees corresponding to different versions of a content file to be linked together by allowing a node of a later version of a file tree to reference a node of a previous version of a file tree. A file tree is comprised of a root node, one or more levels of one or more intermediate nodes, and one or more leaf nodes.

Portions of a content file may be migrated from a primary storage system to the secondary storage system 122 at time $t_0$. The portions may include some of or an entire content file. A client system, such as client system 102, may request access to the data associated with the content file at time $t_1$. The client system may make one or more modifications to the data associated with the content file. Such modifications have corresponding changes in the file tree.

A root node or an intermediate node of a version of a file tree may reference an intermediate node or a leaf node of a previous version of a file tree. Similar to the snapshot tree structure, the file tree structure allows different versions of file data to share nodes and allows changes to a content file to be tracked. When a backup is received, a root node of the file tree may be linked to one or more intermediate nodes associated with a previous file tree.

In the example shown, tree data structure 350 includes a file tree comprising root node 302, intermediate nodes 312, 314, and leaf nodes 322, 324, 326, 328, and 330. Tree data structure 350 also includes a second file tree that corresponds to file metadata associated with a content file data at a particular point in time t+n, for example at time $t_1$. The second file tree is comprised of root node 304, intermediate nodes 312, 314, and leaf nodes 322, 324, 326, 328, and 330. To create a new version of a content file at time t+n, a new root node is created. The new root node includes the same set of pointers as the original node. In the example shown, root node 304 includes a set of pointers to intermediate nodes 312, 314, which are intermediate nodes associated with a previous backup. The new root node also includes a different NodeID and a different TreeID. The TreeID is the view identifier associated with a view/backup of the file tree at a particular moment in time. In some embodiments, root node 304 is associated with a current view of the file data. The current view may represent a state of the file data that is up-to-date and is capable of receiving one or more modifications to the file tree that correspond to modifications to the file data. A file tree may be a current view until a subsequent backup is performed. The TreeID of a root node indicates a view/backup with which the root node is associated. For example, root node 302 with a TreeID of "1" is associated with a first backup and root node 304 with a TreeID of "2" is associated with a second backup. In other embodiments, root node 304 is associated with a snapshot view of the file data. A snapshot view may represent a state of the file data at a particular moment in time in the past and is not updated.

In the example shown, root node 304 is a copy of root node 302. Similar to root node 302, root node 304 includes the same pointers as root node 302. Root node 304 includes a first set of pointers to intermediate node 312. The first set of pointers associated with a data key (e.g., "1," "2," or "3") less than or equal the node key indicates that traversing a file tree included in tree data structure 350 from root node 304 to intermediate node 312 will lead to a leaf node with a data key of "1," "2," or "3." Root node 304 includes a second set of pointers to intermediate node 314. The second set of pointers associated with a data key greater than the node key indicates that traversing a file tree included in tree data structure 350 from root node 304 to intermediate node 314 will lead to a leaf node with a data key of "4" or "5." Root node 304 includes a NodeID of "FR2" and a TreeID of "2." The NodeID identifies the name of the node. The TreeID identifies the view/backup with which the node is associated.

Figure 3C:
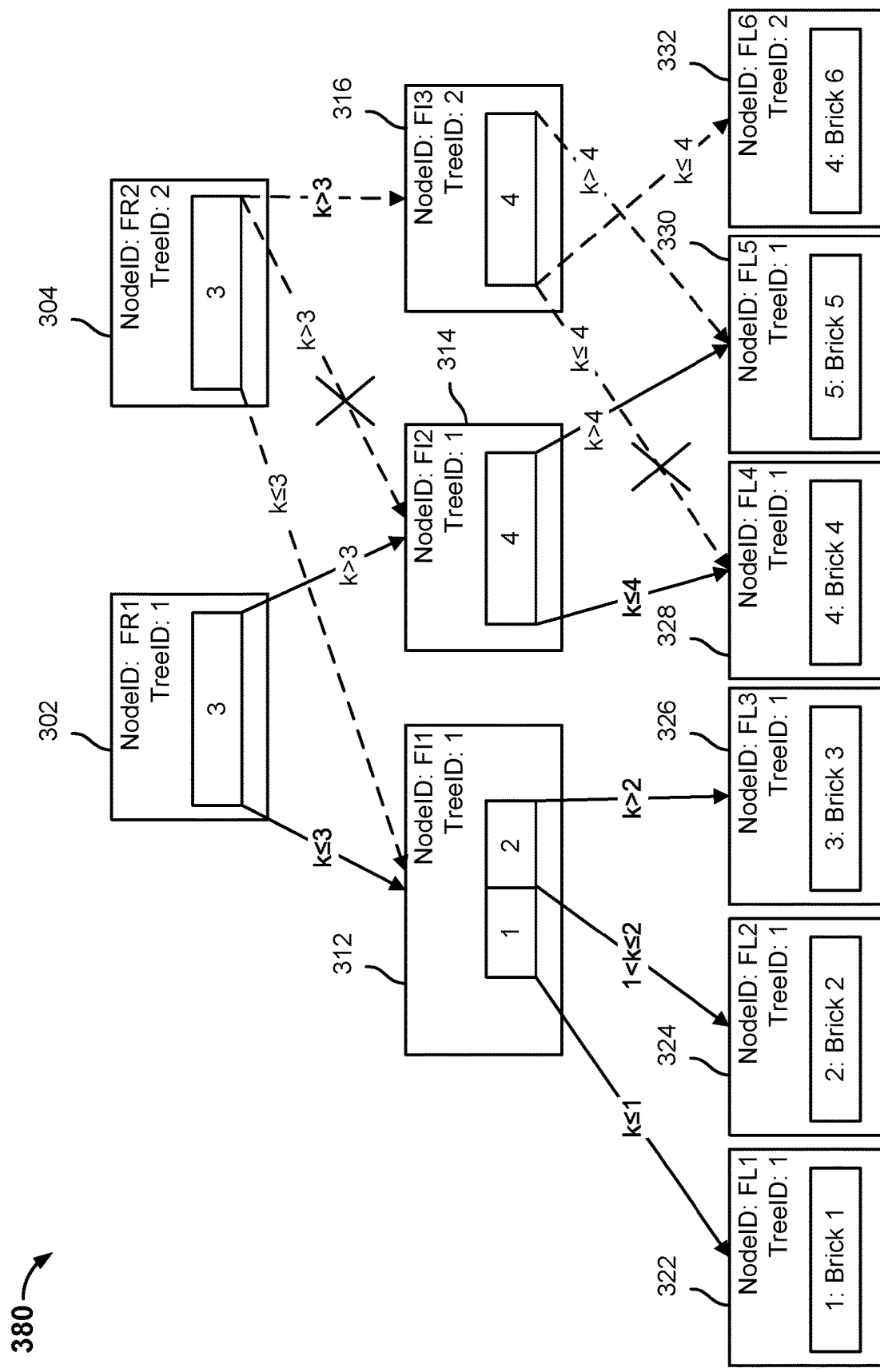
FIG. 3C is a block diagram illustrating an embodiment of modifying a file tree of a tree data structure.

FIG. 3C is a block diagram illustrating an embodiment of modifying a file tree of a tree data structure. In the example shown, tree data structure 380 may be modified by a file system manager, such as file system manager 126. A file tree with root node 304 may be a current view of the file data at time t+n+m, for example, at time $t_2$. A current view may represent a state of the file data that is up-to-date and capable of receiving one or more modifications to the file tree that correspond to modifications to the file system data. A file tree may be a current view until a subsequent backup is performed.

In some embodiments, the file data may be modified such that one of the data chunks is replaced by another data chunk. When a data chunk of file data associated with a previous backup is replaced with a new data chunk, the data brick storing the data chunk may be different. A leaf node of a file tree stores a brick identifier associated with a particular brick storing the data chunk. To represent this modification to the file data, a corresponding modification is made to a current view of a file tree. The current view of the file tree is modified because the previous file tree is a snapshot view and can no longer be modified. The data chunk of the file data that was replaced has a corresponding leaf node in the previous file tree. A new leaf node in the current view of the file tree is created, as described herein, that corresponds to the new data chunk. The new leaf node includes an identifier associated with the current view. The new leaf node may also store the chunk identifier associated with the modified data chunk.

In the example shown, a data chunk included in "Brick 4" has been modified. The data chunk included in "Brick 4" has been replaced with a data chunk included in "Brick 6." At $t_2$, the file system manager starts at root node 304 because that is the root node associated with the file tree at time $t_2$. The value "Brick 4" is associated with the data key "4." The file system manager traverses tree data structure 380 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 380 from intermediate node 316 to leaf node 328, determines that the TreeID of leaf node 328 does not match the TreeID of root node 304, and creates a copy of leaf node 328. Leaf node 332 is a copy of leaf node 328, but stores the brick identifier "Brick 6" and includes the same TreeID as root node 304. The file system manager updates a pointer of intermediate node 316 to point to leaf node 332 instead of pointing to leaf node 328.

Figure 3D:
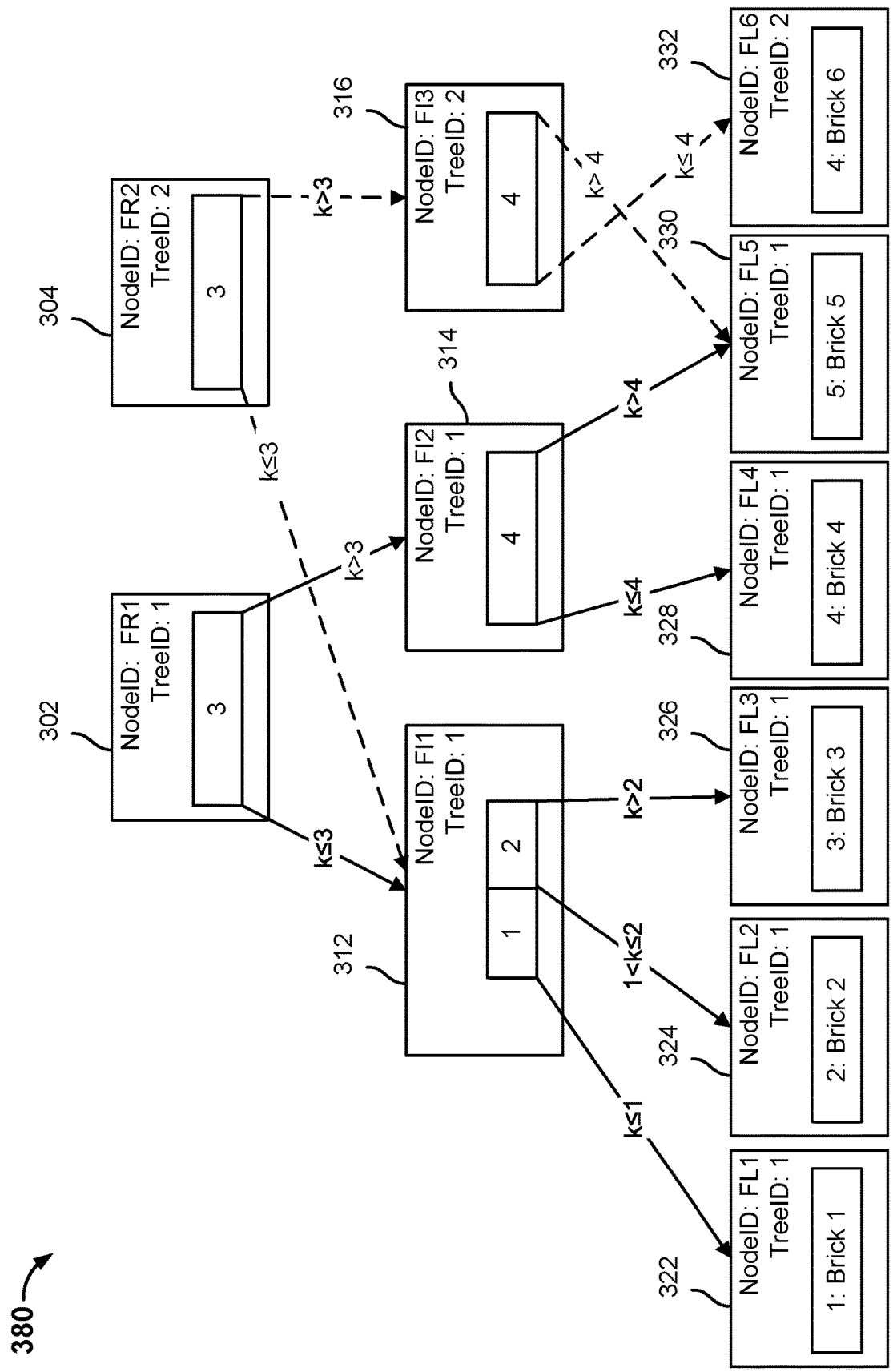
FIG. 3D is a block diagram illustrating an embodiment of a modified file tree.

FIG. 3D is a block diagram illustrating an embodiment of a modified file tree. The file tree 380 shown in FIG. 3D illustrates a result of the modifications made to file tree 380 as described with respect to FIG. 3C.

Figure 4:
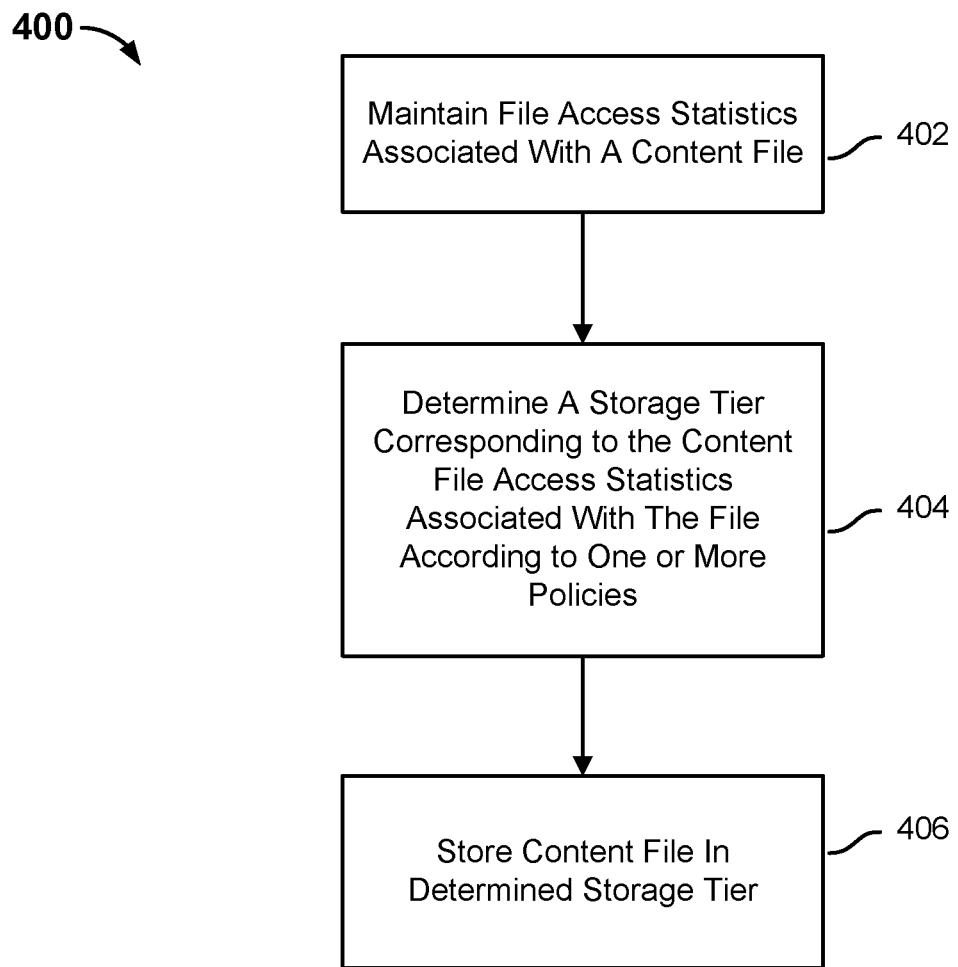
FIG. 4 is a flow chart illustrating an embodiment of storing data associated with a content file according to a migration policies.

FIG. 4 is a flow chart illustrating an embodiment of storing data associated with a content file according to a migration policies. In the example shown, process 400 may be performed by a secondary storage system, such as secondary storage system 122.

At 402, file access statistics associated with a content file are maintained. In some embodiments, a file tier agent may poll may poll a primary storage system for access information associated with a content file. For example, the primary storage system may provide information, such as a last access time associated with a content file. In some embodiments, a file tier client is installed on the primary storage system. The file tier client may communicate with the file tier agent on the secondary storage system and provide time-series data of a plurality of access events associated with portions of the plurality of content files stored on the primary storage system. In some embodiments, the file tier client may determine the number of times a file stub stored on the primary storage system is accessed.

In other embodiments, a file tier agent may maintain time-series data of all access events associated with portions of a content file stored on the secondary storage system. A file tier agent is able to determine statistics associated with portions of a content file, such as the number of times a particular portion of the content file was accessed in the last day, last week, last month, last six months, etc. The file tier agent is also able to determine access patterns associated with the portions of the plurality of content files stored on the secondary storage system. For example, the file tier agent may determine that a content file (e.g., tax documents) is more frequently accessed between the months of January and April than the rest of the year.

In some embodiments, a file tier client is installed on a cloud storage system. The file tier client may communicate with the file tier agent on the secondary storage system and provide time-series data of a plurality of access events associated with the portions of the plurality of content files stored on the cloud storage system.

At 404, a storage tier corresponding to the statistics associated with the content file is determined. The time-series data of all access events associated with the content files stored on a secondary storage system and/or primary storage system enables the file tier agent to implement a plurality of migration policies for content files.

The file tier agent may implement a policy to migrate data associated with a content file from a primary storage system to a secondary storage system. The data associated with the content file may include some of or an entire content file. The file tier agent may poll the primary storage system for access information associated with a content file. For example, the primary storage system may provide information, such as a last access time associated with a content file. In some embodiments, a file tier client is installed on the primary storage system. The file tier client may communicate with the file tier agent on the secondary storage system and provide time-series data of a plurality of access events associated with the portions of the plurality of content files stored on the primary storage system. In some embodiments, a portion of a content file migrated to the secondary storage system (e.g., the "cold" portion) and the other portion of the content file remains on the primary storage system (e.g., the "hot" portion). In other embodiments, the entire content file is migrated to the secondary storage system.

The file tier agent may implement a policy to migrate data associated with a content file from the secondary storage system to the primary storage system. For example, data associated with a content file (e.g., tax document) may be stored on the secondary storage system. The data associated with the content file may be migrated to the primary storage system for a period when the content file is likely to be frequently accessed (e.g., January to April). The data associated with a content file may be migrated to the primary storage system in the event the content file is accessed more than a threshold number of times within a particular time period. In some embodiments, a portion of a content file is migrated back to the primary storage system (e.g., the "hot" portion) and the other portion of the content file remains on the secondary storage system (e.g., the "cold" portion). In other embodiments, the entire content file is migrated back to the primary storage system.

The file tier agent may implement a policy to migrate data associated with a content file from the secondary storage system to a cloud storage system. A content file stored on the secondary storage system may not be accessed for a threshold number of times within a threshold time period (e.g., one access within a two year period). For example, an enterprise may be required to maintain content files for legal compliance purposes, but the content files are never accessed. The data associated with such content files may be migrated from the secondary storage system to the cloud storage system. In some embodiments, a portion of a content file is migrated to the cloud storage system (e.g., the "colder" portion) and the other portion of the content file remains on the secondary storage system (e.g., the "cold" portion). In other embodiments, the entire content file is migrated to the cloud storage system.

The file tier agent may implement a policy to migrate data associated with a content file from the cloud storage system to the secondary storage system or the primary storage system. A content file stored in the cloud storage system may be access for a threshold number of times within a threshold time period (e.g., two accesses within a one year period). The data associated with such content files may be migrated from the cloud storage system to the secondary storage system or the primary storage system, depending upon the frequency of access. The policy may implement two separate access thresholds. For example, in the event a content file stored in the cloud storage system is accessed more than a first threshold, but less than a second threshold, the data associated with the content file may be migrated from the cloud storage system to the secondary storage system. In the event a content file stored in the cloud storage system is access more than a first threshold and more than a second threshold, the data associated with the content file may be migrated from the cloud storage system to the primary storage system. In some embodiments, a portion of a content file is migrated back to the primary storage system (e.g., the "hot" portion) or the secondary storage system (e.g., the "cold" portion" and the other portion of the content file remains on the cloud storage system (e.g., the "colder" portion). In other embodiments, the entire content file is migrated back to the primary storage system or the secondary storage system.

At 406, the content file is stored in the determined tier. For example, portions of a content file is stored on either the primary storage system, secondary storage system, or a cloud storage system based on the determined tier. This may ensure that portions of a content file are stored in a storage tier that is commensurate with an access frequency associated with the content file and that the storage of a storage tier is optimally used. Storing a content file on a primary storage system is expensive. This ensures that portions of a content file stored on a primary storage system is worth the cost of storage.

In some embodiments, portions of a content file are stored on a secondary storage system. The file metadata associated with the content file may be stored in a file metadata structure, such as a file tree.

Figure 5:
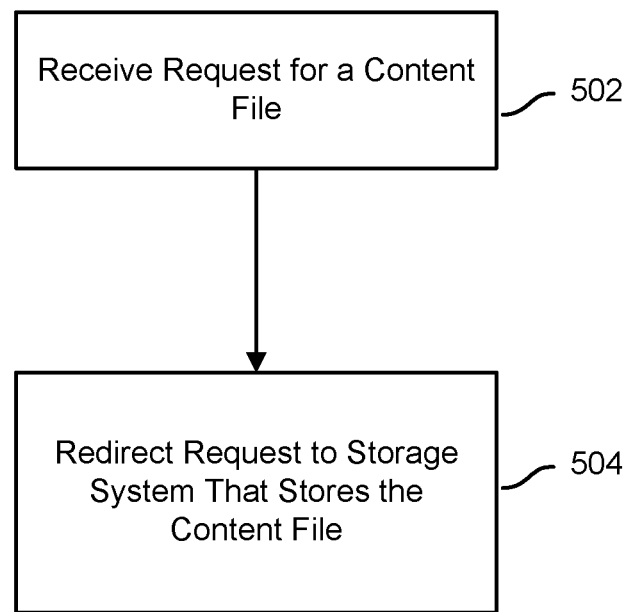
FIG. 5 is a flow chart illustrating an embodiment of providing a content file.

FIG. 5 is a flow chart illustrating an embodiment of providing a content file. In the example shown, process 500 may be performed by a primary storage system, such as primary storage system 112.

At 502, a request for a content file is received. Portions of a content file may be stored on a primary storage system, a secondary storage system, or a cloud storage system. A frequency at which the content file is access may determine which storage system the content file is stored. Portions of content files that are stored on a primary storage system are frequently accessed (e.g., accessed greater than or equal to a threshold number of times within a particular time period). Portions of content files that are stored on a secondary storage system are accessed less frequently than the content files stored on the primary storage system (e.g., accessed less than the threshold number of times within the particular time period). Portions of content files that are stored on a cloud storage system are access less frequently than the content files stored on the primary storage system and the secondary storage system (e.g., accessed less than the threshold number of times within the particular time period and less than a second threshold number of times within a second particular time period).

At 504, the request is redirected to a storage system that stores the content file. Portions of a content file that is stored in either the secondary storage system or the cloud storage system may have, at one time, been stored on the primary storage system. The portions may include some of or an entire content file. When the portion of the content file is migrated, the migrated portion of the content file is deleted from the primary storage system and replaced with a file stub. The primary storage system may store a file stub that includes a redirect (e.g., SMB widelink, vendor-specific APIs) to the migrated portions of the content file.

Figure 6:
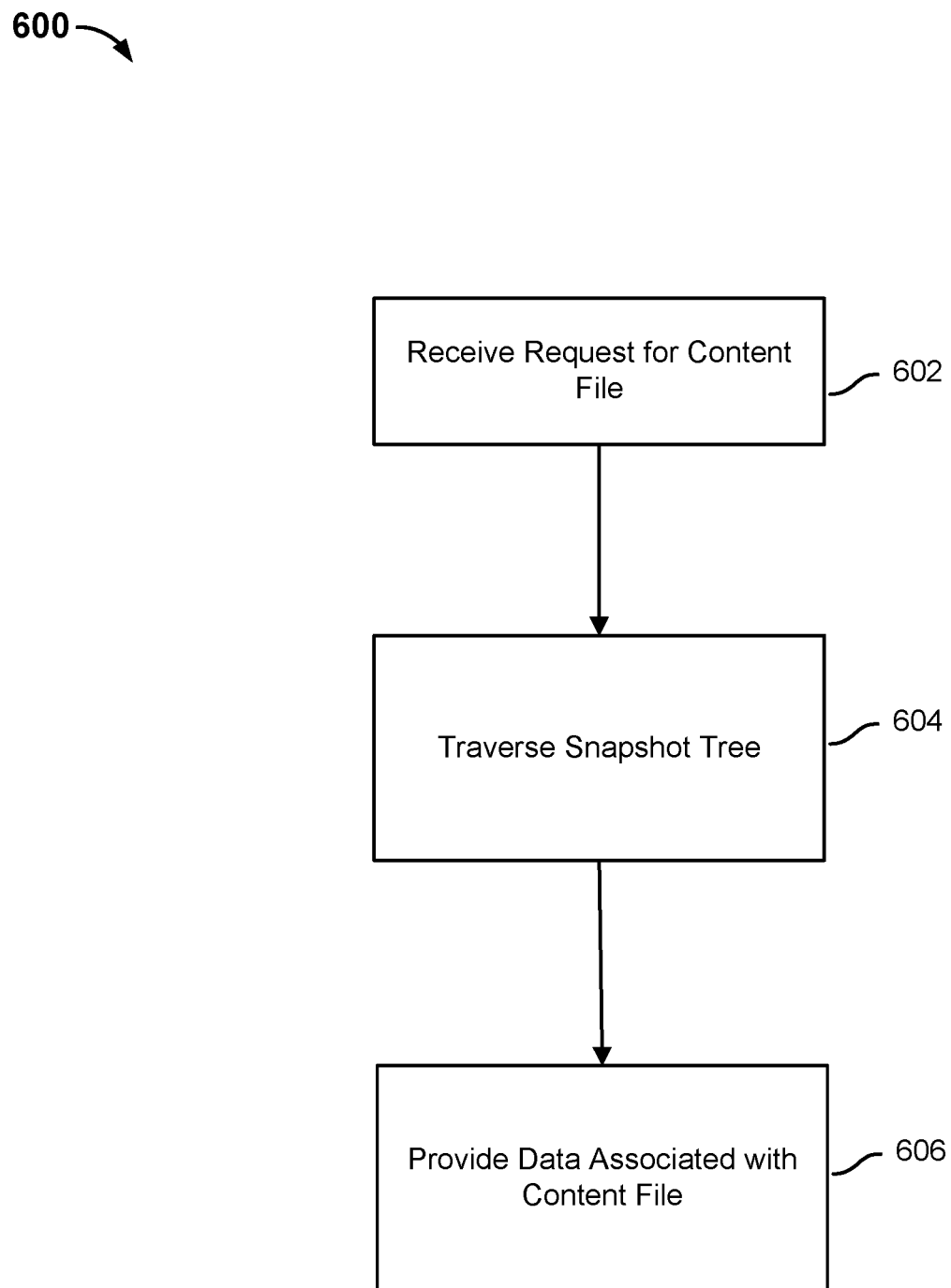
FIG. 6 is a flow chart illustrating an embodiment of providing a content file.

FIG. 6 is a flow chart illustrating an embodiment of providing a content file. In the example shown, process 600 may be performed by a secondary storage system, such as secondary storage system 122.

At 602, a request for a content file is received. The request may be a redirect from a primary storage system. Portions of the content file may be stored on a secondary storage system across one or more storage nodes. The redirect may include a storage location of the portions of the content file on the secondary storage system. The portions of the content file may be included in a backup that is received from a primary storage system. The backup may be comprised of data associated with one or more content files. The portions of the one or more content files may correspond to files that are not frequently accessed on a primary storage system (e.g., cold file). A file system manager of a secondary storage system may organize the data associated with the received portions of the one or more content files using a tree data structure. The view of the content file data corresponding to the backup is comprised of a snapshot tree and a plurality of file trees (e.g., Blob structures). A file tree is a metadata structure that stores the file metadata associated with a content file.

At 604, a snapshot tree is traversed. A snapshot tree includes a root node, one or more levels of one or more intermediate nodes associated with the root node, and one or more leaf nodes associated with an intermediate node of the lowest intermediate level. A root node of a snapshot tree corresponds to a particular moment in time when a backup was performed. A snapshot tree from the latest backup may be traversed from the root node of the snapshot tree to one of the leaf nodes of the snapshot tree corresponding to the requested content file. In the event the size of the file metadata associated with the content file is less than a limit size, a leaf node may store file metadata associated with the content file. For example, the file metadata may include an identifier or a pointer to one or more bricks corresponding to the content file. A brick may store one or more data chunks of the content file. In the event the size of the file metadata associated with the content file is greater than or equal to the limit size, the file metadata associated with the content file is stored in a separate file tree. A leaf node of the snapshot tree may include an identifier or a pointer to the file tree corresponding to the content file. The file tree corresponding to the content file may be traversed to determine the location of the data associated with the content file.

At 606, data associated with the content file is provided. In some embodiments, the file metadata associated with a content file is stored in a leaf node of a snapshot tree. The file metadata may an identifier or a pointer to one or more bricks corresponding to the content file. A brick may store one or more data chunks of the content file. The data associated with the content file is retrieved from the one or more bricks corresponding to the content file and provided to the requesting system.

In other embodiments, the file metadata associated with a content file is stored in a file tree. The file tree is comprised of one or more leaf nodes. A leaf node includes an identifier or a pointer to a brick corresponding to the content file. A brick is comprised of one or more data chunks of the content file. The file tree corresponding to the content file is traversed, the one or more bricks of a content file are identified, and the data chunks of the content file are provided to the requesting system.

Organizing the file metadata associated with a content file using a snapshot tree enables the secondary storage system to efficiently locate and provide the data associated with the content file. As a result, the client system may access the content file via the primary storage system and not be aware that the content file is stored on the secondary storage system because there is a negligible delay in accessing the content file.

Figure 7:
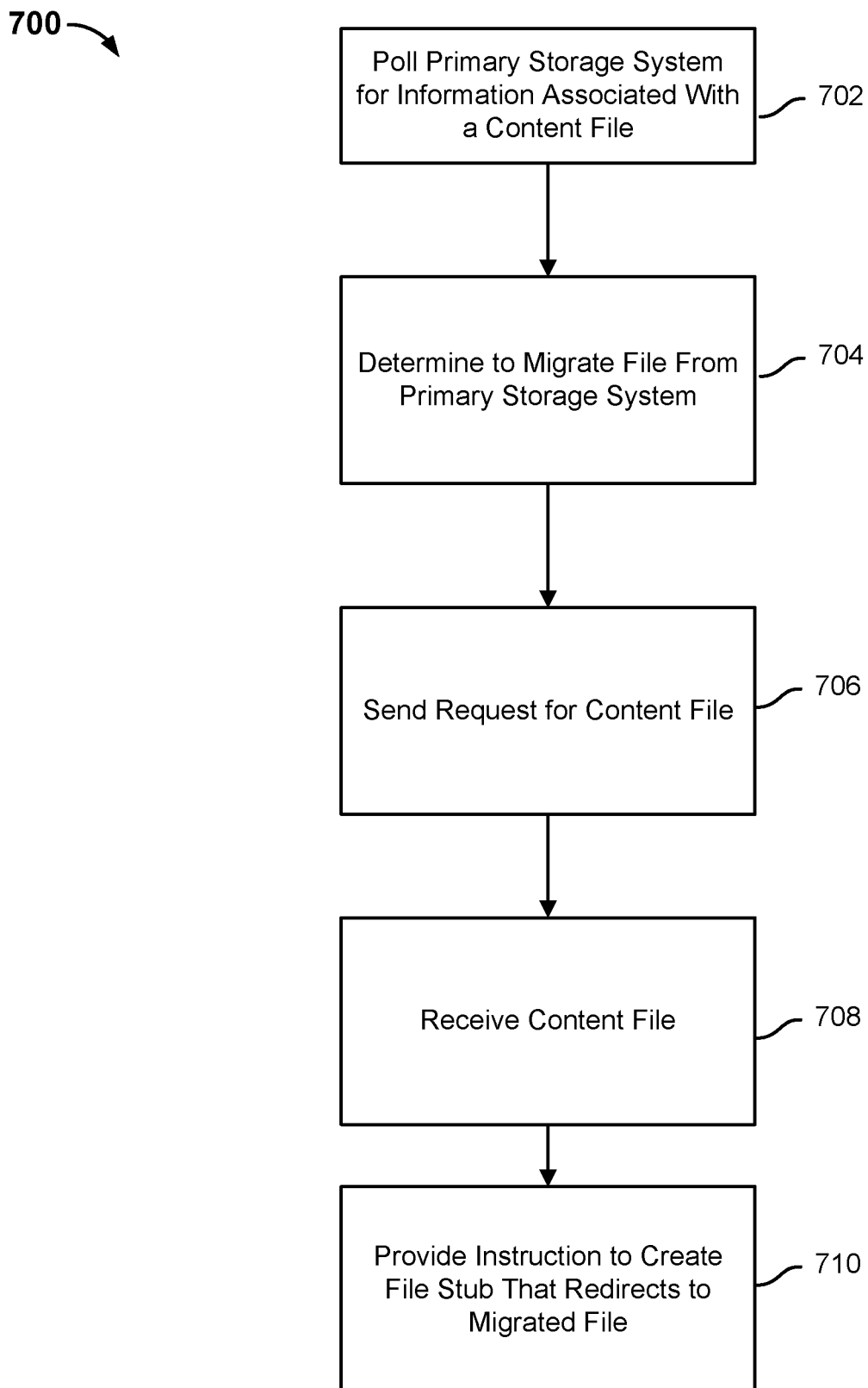
FIG. 7 is a flow chart illustrating an embodiment of creating a file stub.

FIG. 7 is a flow chart illustrating an embodiment of creating a file stub. In the example shown, process 700 may be performed by a secondary storage system, such as secondary storage system 122.

At 702, a primary storage system is polled for information associated with a content file. The information associated with the content file may include a last access time associated with a content file. In some embodiments, a file tier client is installed on the primary storage system. The file tier client may communicate with a file tier agent on the secondary storage system and provide time-series data of a plurality of access events associated with the content file.

At 704, it is determined to migrate portions of the content file from the primary storage system to the secondary storage system. The portions may include some of or the entire content file. A file tier agent may determine that the content file is not frequently used (e.g., accessed more than a threshold number of times within a particular time period.) Storing data associated with a content file on the primary storage system is more expensive than storing data associated a content file on a secondary storage system because access to the content file may be provided very fast, but such access speed comes at a storage cost. Storing data on a primary storage system is more expensive than storing the data on a secondary storage system.

At 706, a request for the content file is provided to the primary storage system. In some embodiments, the request includes a request for the entire content file. In other embodiments, the request includes a request for a portion of the content file. The portion may correspond to a portion of the content file that is not frequently accessed.

At 708, the requested content file is received. The requested content file and associated metadata are received and stored on the secondary storage system. The requested file is no longer stored on the primary storage system. The metadata associated with the content file may be organized using a tree data structure. When a request for the content file is received, the tree data structure enables the secondary storage system to locate and provide the data associated with the content file with negligible delay.

At 710, an instruction is provided to the primary storage system. The instruction causes the primary storage system to create a file stub for the migrated file. The file stub causes a request for the content file that is received at the primary storage system to be redirected to the secondary storage system. The instruction includes a location of the migrated portion of the file stored on the secondary storage system.

The redirect may include a redirect to a root node of a snapshot tree associated with the content file. The data associated with the content file may be located by traversing the snapshot tree associated with the content file and the file tree associated with the content file.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    generating, by a storage system, a tree data structure for a file provided to the storage system from a first storage tier, wherein the tree data structure is used to capture different versions of the file at different moments in time;
    determining, by the storage system, an access pattern associated with the file stored on the storage system, wherein the storage system determines the access pattern associated with the file based on time-series data associated with the file using the tree data structure that captures different versions of the file at different moments in time, wherein the tree data structure associated with the file indicates one or more modifications made to the file over a particular period of time;
    determining, by the storage system, to migrate the file from the first storage tier to a different storage tier based on the access pattern associated with the file that is maintained by the storage system, wherein the access pattern associated with the file indicates that file has not been accessed more than a threshold number of times within the particular period of time; and
    migrating the file from the first storage tier to the different storage tier, wherein migrating the file includes:
        providing from the storage system to the first storage tier a request for a version of the file stored on the first storage tier, wherein in response to the request for the version of the file, the first storage tier provides to the different storage tier contents associated with the version of the file and deletes the contents associated with the version of the file, wherein the contents associated with the version of the file are stored at the different storage tier; and
        providing to the first storage tier an instruction to create a redirection for the version of the file stored on the different storage tier.

2. The method of claim 1, further comprising polling the first storage tier for information associated with the file.

3. The method of claim 2, wherein the information associated with the file includes a last access time associated with the file.

4. The method of claim 1, wherein the different storage tier is the storage system or a cloud storage system.

5. The method of claim 1, wherein the contents associated with the version of the file is an entire file.

6. The method of claim 1, wherein in response to receiving the instruction, the first storage tier creates the redirection.

7. The method of claim 6, wherein the redirection causes a subsequent request for the file received at the first storage tier to be redirected to the different storage tier.

8. The method of claim 7, wherein the subsequent request for the file is redirected to a first root node of the tree data structure associated with the file.

9. The method of claim 1, wherein the determining to migrate the file from the first storage tier to the different storage tier is determined by a file tier agent of the storage system.

10. The method of claim 1, wherein the file is determined to be migrated from the first storage tier to the different storage tier based on one or more migration policies.

11. A computer program product, the computer program product being embodied in a non-transitory computer readable storage medium and comprising computer instructions for:
    generating, by a storage system, a tree data structure for a file provided to the storage system from a first storage tier, wherein the tree data structure is used to capture different versions of the file at different moments in time;
    determining, by the storage system, an access pattern associated with the file stored on the storage system, wherein the storage system determines the access pattern associated with the file based on time-series data associated with the file using the tree data structure that captures different versions of the file at different moments in time, wherein the tree data structure associated with the file indicates one or more modifications made to the file over a particular period of time;
    determining, by the storage system, to migrate the file from the first storage tier to a different storage tier based on the access pattern associated with the file that is maintained by the storage system, wherein the access pattern associated with the file indicates that file has not been accessed more than a threshold number of times within the particular period of time; and
    migrating the file from the first storage tier to the different storage tier, wherein migrating the file includes:
        providing from the storage system to the first storage tier a request for a version of the file stored on the first storage tier, wherein in response to the request for the version of the file, the first storage tier provides to the different storage tier contents associated with the version of the file and deletes the contents associated with the version of the file, wherein the contents associated with the version of the file are stored at the different storage tier; and
        providing to the first storage tier an instruction to create a redirection for the version of the file stored on the different storage tier.

12. The computer program product of claim 11, further comprising computer instructions for polling the first storage tier for information associated with the file.

13. The computer program product of claim 12, wherein the information associated with the file includes a last access time associated with the file.

14. The computer program product of claim 11, wherein the different storage tier is the storage system or a cloud storage system.

15. The computer program product of claim 11, wherein the contents associated with the version of the file is an entire file.

16. The computer program product of claim 11, wherein in response to receiving the instruction, the first storage tier creates the redirection.

17. The computer program product of claim 16, wherein the redirection causes a subsequent request for the file received at the first storage tier to be redirected to the different storage tier.

18. The computer program product of claim 17, wherein the subsequent request for the file is redirected to a root node of a corresponding tree data structure associated with the file.

19. The computer program product of claim 11, wherein the determining to migrate the file from the first storage tier to the different storage tier is determined by a file tier agent of the storage system.

20. A storage system, comprising:
a processor configured to:
- generate a tree data structure for a file provided to the storage system from a first storage tier, wherein the tree data structure is used to capture different versions of the file at different moments in time;
- determine an access pattern associated with the file stored on the storage system, wherein the processor determines the access pattern associated with the file based on time-series data associated with the file using the tree data structure that captures different versions of the file at different moments in time, wherein the tree data structure associated with the file indicates one or more modifications made to the file over a particular period of time;
- determine to migrate the file from the first storage tier to a different storage tier based on the access pattern associated with the file that is maintained by the storage system, wherein the access pattern associated with the file indicates that file has not been accessed more than a threshold number of times within the particular period of time; and
- migrate the file from the first storage tier to the different storage tier, wherein to migrate the file, the processor is configured to:
  - provide from the storage system to the first storage tier a request for a version of the file stored on the first storage tier, wherein in response to the request for the version of the file, the first storage tier provides to the different storage tier contents associated with the version of the file and deletes the contents associated with the version of the file, wherein the contents associated with the version of the file are stored at the different storage tier; and
  - provide to the first storage tier an instruction to create a redirection for the version of the file stored on the different storage tier; and a memory coupled to the processor and configured to provide the processor with instructions.

* * * * *

UNITED STATES PATENT AND TRADEMARK OFFICE
CERTIFICATE OF CORRECTION

| | |
|---|---|
| PATENT NO. | : 11,526,291 B2 |
| APPLICATION NO. | : 17/348406 |
| DATED | : December 13, 2022 |
| INVENTOR(S) | : Zheng Cai, Vijay Pasikanti and Ganesha Shanmuganathan |

It is certified that error appears in the above-identified patent and that said Letters Patent is hereby corrected as shown below:

In the Specification

In Column 16, Line 11, after "may", insert --be--.

Signed and Sealed this
Seventeenth Day of October, 2023

Katherine Kelly Vidal
*Director of the United States Patent and Trademark Office*